US008340690B2

(12) United States Patent
Wong et al.

(10) Patent No.: US 8,340,690 B2
(45) Date of Patent: Dec. 25, 2012

(54) MECHANISM FOR CONTENT MANAGEMENT IN WIRELESS MOBILE NETWORKS

(75) Inventors: Ho Yin Starsky Wong, Ossining, NY (US); Kang-Won Lee, Nanuet, NY (US); Suk-Bok Lee, Seoul (KR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/082,671

(22) Filed: Apr. 8, 2011

(65) Prior Publication Data

US 2012/0258727 A1     Oct. 11, 2012

(51) Int. Cl.
*H04W 88/02*     (2009.01)

(52) U.S. Cl. ................................... 455/456.3

(58) Field of Classification Search ............... 455/456.3; 370/252, 255, 328; 715/854; 713/168; 701/2
See application file for complete search history.

(56) References Cited

U.S. PATENT DOCUMENTS

| | | | |
|---|---|---|---|
| 7,747,963 B2 | 6/2010 | Othmer et al. | |
| 2003/0126197 A1 | 7/2003 | Black et al. | |
| 2006/0095582 A1* | 5/2006 | Nitya et al. | 709/236 |
| 2007/0161382 A1 | 7/2007 | Melinger et al. | |
| 2007/0280136 A1* | 12/2007 | Chen et al. | 370/254 |
| 2008/0059721 A1 | 3/2008 | Turner et al. | |
| 2008/0172445 A1 | 7/2008 | Zaidelson et al. | |
| 2008/0219237 A1* | 9/2008 | Thubert et al. | 370/349 |
| 2009/0037960 A1 | 2/2009 | Melby | |
| 2009/0049098 A1 | 2/2009 | Pickelsimer et al. | |
| 2009/0150832 A1* | 6/2009 | Keller et al. | 715/854 |
| 2009/0254661 A1 | 10/2009 | Fullagar et al. | |
| 2009/0282159 A1 | 11/2009 | Wang et al. | |
| 2010/0185663 A1 | 7/2010 | Lei et al. | |
| 2010/0198916 A1 | 8/2010 | Leighton et al. | |
| 2010/0217869 A1 | 8/2010 | Esteban et al. | |
| 2011/0211472 A1* | 9/2011 | Ghanadan et al. | 370/252 |

OTHER PUBLICATIONS

Y. Xu et al., "Geography-informed energy conservation for ad hoc routing," ACM MOBICOM (2001).
F. Ye et al., "A two-tier data dissemination model for large-scale wireless sensor networks," ACM MOBICOM (2002).
H. Yang et al., "Toward resilient security in wireless sensor networks," ACM MOBIHOC (2005).
S. De, "On hop count and euclidean distance in greedy forwarding in wireless ad hoc networks," IEEE Communications Letters, vol. 9, No. 11 (2005).
L. Breslau et al., "Web caching and Zipf-like distributions: evidence and implications," IEEE INFOCOM (1999).
C.E. Perkins et al, "Ad hoc on demand distance vector (AODV) routing protocol," IETF Internet Draft (Jan. 2002).
T. Camp et al., "A survey of mobility models for ad hoc network research," Wireless Communications & Mobile Computing (WCMC): Special issue on mobile ad hoc networking (2002).
K.H. Chiang et al., A 2-D random walk mobility model for location management studies in wireless networks, IEEE Transactions on Vehicular Technology (2004).

(Continued)

*Primary Examiner* — Diane Mizrahi
(74) *Attorney, Agent, or Firm* — Brian P. Verminski; Michael J. Chang, LLC

(57) ABSTRACT

Techniques for content management in wireless mobile networks are provided. In one aspect, a method of managing content stored on a plurality of mobile nodes in a mobile ad hoc network (MANET) is provided. The method includes the following step. The content is bound to one or more geographical locations such that, at any given time, the content is stored on at least one of the nodes at the geographical location.

19 Claims, 11 Drawing Sheets

OTHER PUBLICATIONS

J. Broch et al., "A performance comparison of multi-hop wireless ad hoc network routing protocols," ACM MOBICOM (1998).

Z. Fu et al., "The impact of multihop wireless channel on TCP throughput and loss," IEEE INFOCOM (2003).

J. Li et al., "Capacity of ad hoc wireless networks," ACM MOBICOM (2001).

Tchakarov et al., "Efficient Content Location in Wireless Ad Hoc Networks," Proceedings of the 2004 IEEE International Conference on Mobile Data Management (MDM '04), pp. 74-85 (Aug. 24, 2004).

Tong et al., "Efficient Content Location Based on Interest-Cluster in Peer-To-Peer System," Proceedings of the 2005 IEEE International conference on e-Business Engineering (ICEBE '05), pp. 324-331 (Oct. 12-18, 2005).

A. Carzaniga et al., "Forwarding in a content-based network," ACM SIGCOMM (2003).

A. Carzaniga et al., "A routing scheme for content-based networking," ACM INFOCOM (2004).

V. Jacobson et al., "Networking named content," ACM CoNEXT (2009).

I. Baev et al., "Approximation algorithms for data placement in arbitrary networks," SODA (2001).

E. Cohen et al., "Replication strategies in unstructured peer-to-peer networks," ACM SIGCOMM (2002).

T. Hara et al., "Effective replica allocation in ad hoc networks for improving data accessibility," IEEE INFOCOM (2001).

Ko et al., "Distributed, self-stabilizing placement of replicated resources in emerging networks," IEEE ICNP (2003).

L. Qiu et al., "On the placement of web server replicas," IEEE INFOCOM (2001).

B. Tang at al., "Benefit-based data caching in ad hoc networks," IEEE INFOCOM (2006).

J. Kangasharju et al., "Optimizing file availability in peer-to-peer content distribution," IEEE INFOCOM (2007).

B. Li et al., "On the optimal placement of web proxies in the Internet," IEEE INFOCOM (1999).

G. Cao et al., "Cooperative cache-based data access in ad hoc networks," IEEE Computer, vol. 37, No. 2 (Feb. 2004).

M. Fiore et al., "To cache or not to cache?," IEEE INFOCOM (2009).

L. Yin et al., "Supporting cooperative caching in ad hoc networks," IEEE INFOCOM (2004).

A. Derhab et al., "Data replication protocols for mobile ad-hoc networks: a survey and taxonomy," IEEE Communications Surveys and Tutorials Journal (2009).

Y. Ko et al., "Location-aided routing (LAR) in mobile ad hoc networks," Wireless Networks 6, pp. 307-321 (2000).

Y. Ko et al., "GeoTORA: a protocol for geocasting in mobile ad hoc networks," IEEE ICNP (2000).

* cited by examiner

```
ContentPlacement(content_rank j, storage δ)
Variables: Cell size S_l, content class C_l, assigned storage δ_l
/* Each recursive call records result into variables of layer l */
if j = 0 or δ = 0 then
   return null
else
   Find an i and δ̂ that minimizes ψ(i, j, δ̂) + K + M[i-1, δ - δ̂]
   Put contents {c_i,...,c_j} into new class C_l
   Set δ_l = δ̂  // each node's storage proportion for C_l
   Set S_l = S_(i,j,δ̂)  // cell width of layer l
   Bind contents {c_i,...,c_j} to each cell of layer l
   Call ContentPlacement(i - 1, δ - δ̂)
end if
```

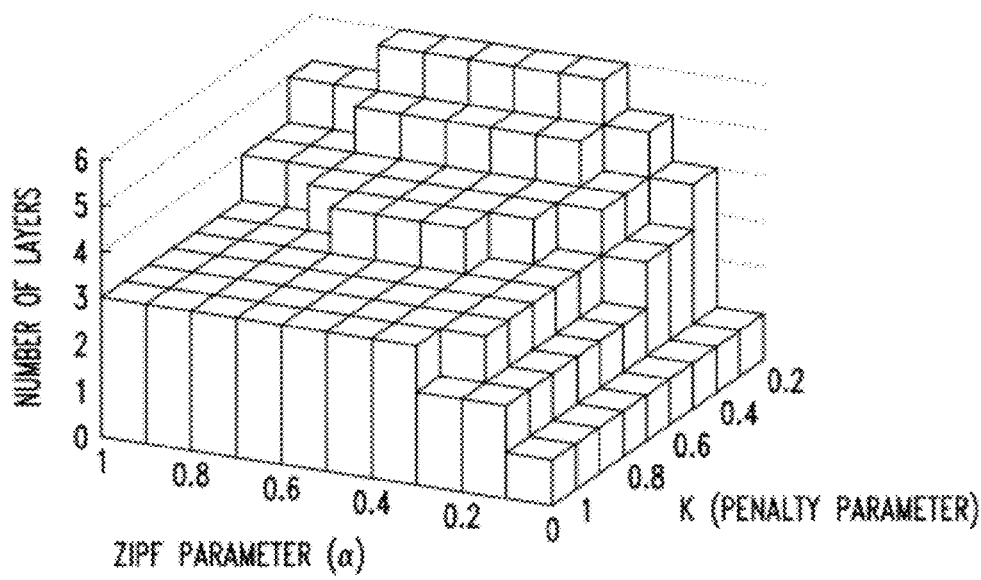

<NODE E's CONTENT CACHE TABLE>

| LAYER | CONTENT ID | $N_E(c_i)$: NODE LIST |
|---|---|---|
| LAYER 1 | C1 | E, B, C |
|  | ⋮ | ⋮ |
| LAYER 2 | ⋮ | ⋮ |
| ⋮ | | |

1000

1100

1300

TABLE I
SIMULATION PARAMETERS

| PARAMETER | DEFAULT VALUE | RANGE |
|---|---|---|
| AREA SIZE | 2.5 × 2.5 km² | |
| NUMBER OF CONTENTS $m$ | 1000 ITEMS | |
| NUMBER OF NODES $n$ | 300 | 200 ~ 400 |
| NODE SPEED $v_{max}$ | 2 m/s | 2 ~ 20 |
| PAUSE TIME (sec) | 180 | |
| CACHE SIZE | 30 SLOTS | 5 ~ 30 |
| MEAN QUERY INTERVAL | 30 sec | 10 ~ 60 |
| ZIPF PARAMETER $\alpha$ | 0.8 | 0 ~ 1 |
| TTL (HOPS) | 10 | |

HOPS vs CACHE SIZE

HOPS vs MOBILE NODE SPEED

HOPS vs NODE COUNT

HOPS vs POPULARITY DISTRIBUTION

LACMA vs
STATIC-OFFLINE
SCHEME

LACMA vs
STATIC-OFFLINE
SCHEME

LACMA vs
STATIC-OFFLINE
SCHEME

HIT RATIO vs
CACHE SIZE

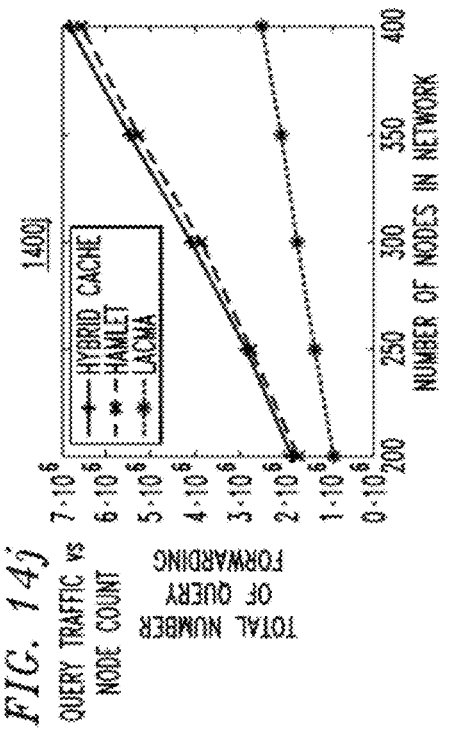
FIG. 14j QUERY TRAFFIC vs NODE COUNT
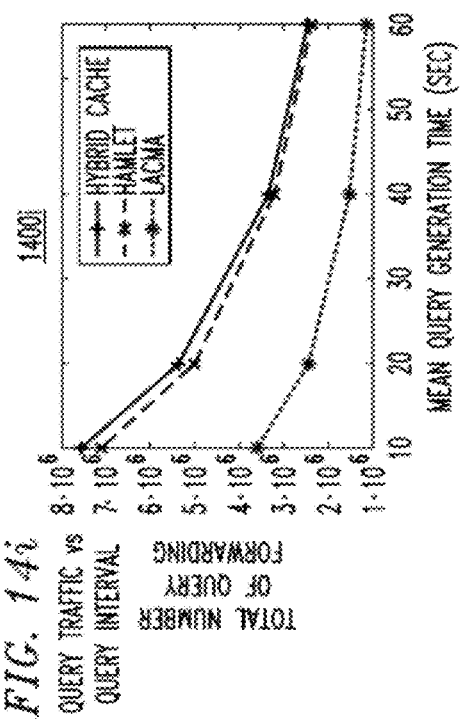
FIG. 14i QUERY TRAFFIC vs QUERY INTERVAL
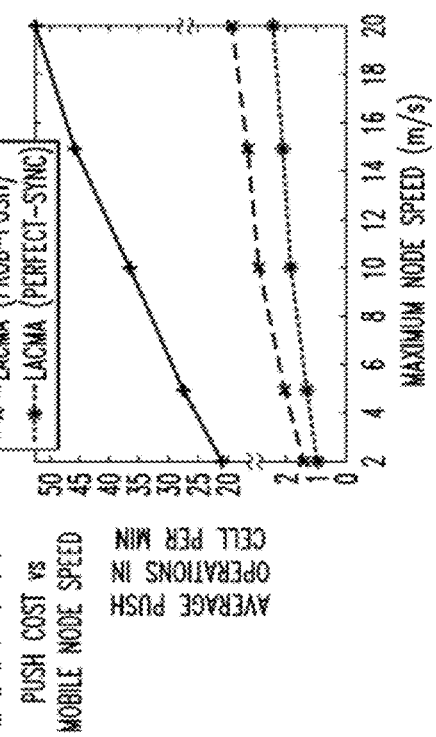
FIG. 14l PUSH COST vs MOBILE NODE SPEED
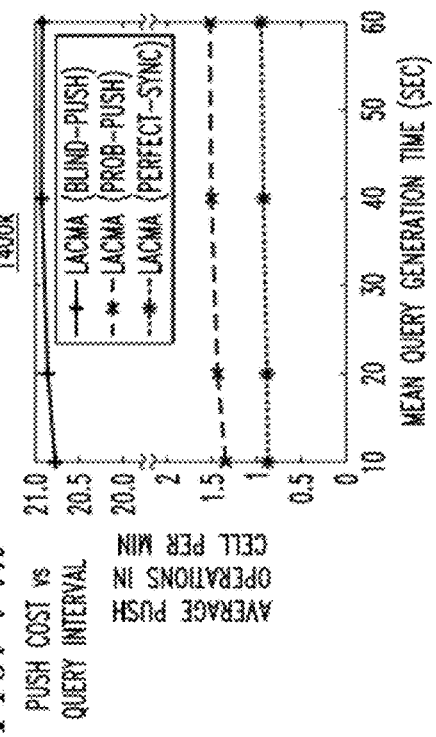
FIG. 14k PUSH COST vs QUERY INTERVAL

1500

MECHANISM FOR CONTENT MANAGEMENT IN WIRELESS MOBILE NETWORKS

STATEMENT OF GOVERNMENT RIGHTS

This invention was made with Government support under Contract number W911NF-06-3-0001 awarded by U.S. Army. The Government has certain rights in this invention.

FIELD OF THE INVENTION

The present invention relates to wireless mobile networks and more particularly, to techniques for content management in wireless mobile networks.

BACKGROUND OF THE INVENTION

Content-centric networking, which focuses on access to contents regardless of the original hosts (of the contents), provides an ideal communication service for content distribution, sharing, and retrieval in large-scale distributed systems. See for example, A. Carzaniga et al., "Forwarding in a content-based network," *ACM SIGCOMM* (2003), A. Carzaniga et al., "A routing scheme for content-based networking," *ACM INFOCOM* (2004) and V. Jacobson et al., "Networking named content," *ACM CoNEXT* (2009). Unlike traditional host-oriented networking, with content-centric networking any node that has a copy of the requested data can respond to the requester, thus reducing access latency, network congestion, and bandwidth consumption. The performance of a content-centric network will depend on several factors. One of the important factors is the availability of content replicas near nodes that might request the content. Thus it is important to design a good mechanism to ensure popular contents are strategically replicated and placed near every node. In a highly dynamic network environment, such as mobile ad hoc networks (MANETs) and wireless peer-to-peer networks, the strategic replica placement is a very challenging task due to the constant changes of network topologies.

Existing replication techniques have been mainly designed for stationary networks, thus they will not be suitable for content placement and management in a dynamic MANET due to prohibitively high management overhead. See, for example, I. Baev et al., "Approximation algorithms for data placement in arbitrary networks," *SODA* (2001) (hereinafter "Baev"), E. Cohen et al., "Replication strategies in unstructured peer-to-peer networks," *ACM SIGCOMM* (2002), T. Hara et al., "Effective replica allocation in ad hoc networks for improving data accessibility," *IEEE INFOCOM* (2001), Ko et al., "Distributed, self-stabilizing placement of replicated resources in emerging networks," *IEEE ICNP* (2003) (hereinafter "Ko"), L. Qiu et al., "On the placement of web server replicas," *IEEE INFOCOM* (2001) (hereinafter "Qiu") and B. Tang et al., "Benefit-based data caching in ad hoc networks," *IEEE INFOCOM* (2006) (hereinafter "Tang"). The current opportunistic caching mechanisms do not try to optimize content placement based on a well-defined performance objective. Hence, they may not result in good performance.

Therefore improved techniques for managing content in a dynamic MANET would be desirable.

SUMMARY OF THE INVENTION

The present invention provides techniques for content management in wireless mobile networks. In one aspect of the invention, a method of managing content stored on a plurality of mobile nodes in a mobile ad hoc network (MANET) is provided. The method includes the following step. The content is bound to one or more geographical locations such that, at any given time, at least one copy of the content is stored on one or more of the nodes at the geographic location.

A more complete understanding of the present invention, as well as further features and advantages of the present invention, will be obtained by reference to the following detailed description and drawings.

BRIEF DESCRIPTION OF THE DRAWINGS

FIG. 4 is a diagram illustrating an exemplary content placement methodology according to an embodiment of the present invention;

FIG. 5 is a graph illustrating the number of layers that the method of FIG. 4 generates against the input values of the Zipf parameter $\alpha$ and the penalty parameter K according to an embodiment of the present invention;

FIG. 14i is a graph illustrating query traffic versus query interval according to an embodiment of the present invention;

FIG. 14j is a graph illustrating query traffic versus node count according to an embodiment of the present invention;

FIG. 14k is a graph illustrating push cost versus query interval according to an embodiment of the present invention;

FIG. 14l is a graph illustrating push cost versus mobile node speed according to an embodiment of the present invention;

DETAILED DESCRIPTION OF PREFERRED EMBODIMENTS

Figure 1:
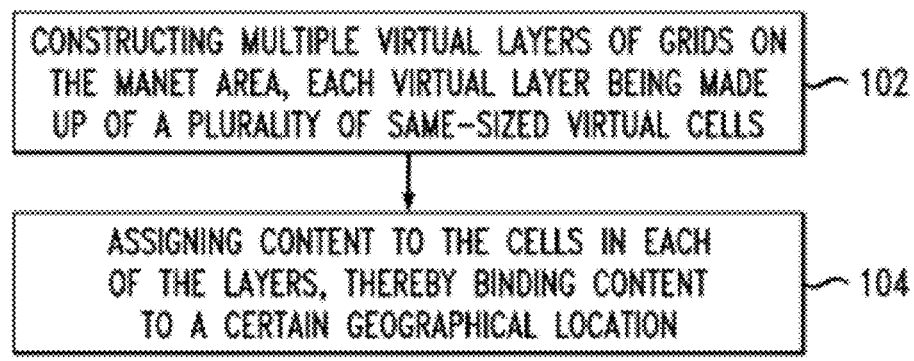
FIG. 1 is a diagram illustrating an exemplary methodology for managing content in a mobile ad hoc network (MANET) containing a plurality of mobile nodes according to an embodiment of the present invention.

Provided herein are techniques for content management in a mobile ad hoc network (MANET) wherein content is bound to a certain geographic location, rather than to nodes within the network, thereby avoiding the above-described problems associated with conventional approaches especially when the nodes are highly mobile. The present techniques are described in the context of content-centric networking in a mobile ad hoc networking environment, where any node with a content copy can act as a server and serve the content to the requester. To support such a networking paradigm, popular contents can be replicated and placed near every node. The key challenge is to maintain such a strategic content placement in the face of constant network topology change due to node mobility. Existing content placement techniques cannot cope with such dynamics since they are designed for static networks. Opportunistic caching approaches often used in mobile networks cannot provide the same level of performance as a careful content placement. Provided herein is a novel content management approach, called location-aided content management approach (LACMA) that leverages the location information available to mobile devices (via a global positioning system). The main idea of LACMA is to decouple data objects from the nodes and instead bind the data to some geographic location. To deal with the dynamic topology, LACMA exploits the fact that MANETs usually form a network in a close proximity of a geographic location where user population is dense. At high-level, LACMA tries to keep a content copy within the specified geographic location by proactive replication of content if necessary. This location-binding property decouples the content placement problem from the topology dynamics and provides coarse grained performance bound. Presented herein is an efficient technique to maintain the content-location binding using a proactive content push method.

To begin, an overview of the system model, the content placement problem and the present location-based approach will now be provided. The first aspect described is content sharing over a MANET. Considered herein is a content-centric MANET, where a set of mobile users wish to share multiple contents in a cooperative manner. For example, consider a campus outdoor environment in which a group of students with mobile devices want to access various university-related contents (e.g., lecture videos, slides, etc.) which the university wants to make readily available to the students. Data access via the centralized server system will suffer from the limited bandwidth of current wireless networks, e.g., 3G wireless or Wi-Fi networks, and thus the students will likely experience poor performance. One possible solution is to have a cache at the local access point, but that does not solve the fundamental congestion at the access point. In this scenario, forming a content-centric MANET will help overcome such limitations by sharing contents among students in a peer-to-peer manner.

The basic procedure for content retrieval in such a network is as follows: 1) a user generates and broadcasts a query for the requested content $c_i$ (unique content identifier i); 2) a node receiving the query sends back $c_i$ to the requesting node if the receiving node has a copy of $c_i$ in its cache. Otherwise, that node rebroadcasts the query for $c_i$; 3) once found, content $c_i$ is delivered back to the requester in unicast, by backtracking the path of the request, which is recorded in the query; and 4) the original requester then caches a copy of $c_i$ and that node can act as a provider of $c_i$ for future requests by others. In such a system, the intelligent placement of replicated contents in the peer-to-peer network nodes so that popular content copies can be downloaded from a nearby peer can considerably enhance performance.

Content placement objective is now discussed. The general problem of determining optimal replica placement in an arbitrary network G(N, E) with m contents, $c_1, \ldots, c_m$, is to find the placement $\Psi$ on graph, where each node x stores content replicas up to its capacity $w_x$, to minimize the total data access cost of client queries in the network:

$$\Gamma(G, \Psi) = \sum_{x \in N} \sum_{i=1}^{m} f_{x,c_i} \times d(x, c_i), \quad (1)$$

wherein $f_{x,c_i}$ is access frequency of content $c_i$ by node x, i.e., reflecting content popularity, and $d(x,c_i)$ is the distance (e.g., hop count along the shortest path) between x and the closest node who has a copy of $c_i$. This placement problem is known to be NP-hard even for a fixed network. See, for example, Baev, the contents of which are incorporated by reference herein.

For reference, some conventional approaches are now described to help understand the present techniques. Due to the hardness nature of the problem, a large body of work in this area has focused on developing more practical methods, such as polynomial-time, constant-factor approximation methods for general stationary networks in the context of peer-to-peer networks (see, for example, J. Kangasharju et al., "Optimizing file availability in peer-to-peer content distribution," *IEEE INFOCOM* (2007) and Ko, the contents of each of which are incorporated by reference herein), world wide web (see, for example, B. Li et al., "On the optimal placement of web proxies in the Internet," *IEEE INFOCOM* (1999) and Qiu, the contents of each of which are incorporated by reference herein), and ad hoc networks with static node cases (see, for example, Tang, the contents of which are incorporated by reference herein). In particular, the work in Tang presents a 2-approximation (4-approximation for non-uniform size items) offline methodology for the above problem with the global knowledge of the network, which is the currently best known approximation result.

However, none of the existing solutions for static networks are applicable to the highly mobile environment like mobile ad hoc peer-to-peer networks, since node mobility renders G a dynamic time-varying graph, hence requiring that a new placement Ψ be computed upon every network topology change. On the other hand, opportunistic caching is largely used in mobile networks, where intermediate nodes eavesdrop the ongoing data transmission and cache the data in a hope to serve future requests more efficiently. See, for example, G. Cao et al., "Cooperative cache-based data access in ad hoc networks," IEEE Computer, vol. 37, no. 2 (February 2004), M. Fiore et al., "To cache or not to cache?," *IEEE INFOCOM* (2009) (hereinafter "Fiore") and L. Yin et al., "Supporting cooperative caching in ad hoc networks," *IEEE INFOCOM* (2004) (hereinafter "Yin"), the contents of each of which are incorporated by reference herein. In particular, Yin proposes a hybrid caching technique that allows nodes on the data path to cache the relaying item if its size is small, otherwise to cache the data path towards the data holder to reduce future query delay. A more recent work pursues content diversity among nearby nodes. See, for example, Fiore. That work involves overhearing the cached items in the neighborhood so that each node can drop the redundant items in its cache to save storage space.

However, the performance of caching is limited by the query process, and caching fails to provide any ensured content availability against the node mobility. By contrast, the present techniques focus on a replication approach rather than caching, as this approach can improve data availability more than caching. See, for example, A. Derhab et al., "Data replication protocols for mobile ad-hoc networks: a survey and taxonomy," IEEE Communications Surveys and Tutorials Journal (2009), the contents of which are incorporated by reference herein. This is because the replication protocol triggers the replication process independently of client queries. Both approaches will be compared and their results presented below. There have been several proposals that also utilize location information in other problem domains. In Location-aided routing (see, for example, Y. Ko et al., "Location-aided routing (LAR) in mobile ad hoc networks," Wireless Networks 6, pgs. 307-321 (2000), the contents of which are incorporated by reference herein) and GeoTORA (see, for example, Y. Ko et al., "GeoTORA: a protocol for geocasting in mobile ad hoc networks," *IEEE ICNP* (2000), the contents of which are incorporated by reference herein), the flooding is limited to the geographic region to reduce the number of messages propagated over the network. Geographical adaptive fidelity algorithm (GAF) uses a virtual grid to turn off redundant nodes for energy conservation. See, for example, Y. Xu et al., "Geography-informed energy conservation for ad hoc routing," *ACM MOBICOM* (2001), the contents of which are incorporated by reference herein. In two-tier data dissemination model (TTDD), each sensor node independently builds a grid to facilitate data dissemination towards mobile sinks. See, for example, F. Ye et al., "A two-tier data dissemination model for large-scale wireless sensor networks," *ACM MOBICOM* (2002), the contents of which are incorporated by reference herein. Location-based resilient security solution (LBRS) allows sensor nodes to derive the secret keys based on their locations to localize the impact of compromised nodes. See, for example, H. Yang et al., "Toward resilient security in wireless sensor networks," *ACM MOBIHOC* (2005), the contents of which are incorporated by reference herein. The present location-based design (referred to herein as "location-aided content management approach" or "LACMA") differs from conventional approaches in that LACMA leverages the location information to eliminate the dependency on the topology dynamics of the highly mobile environment.

Content management in a mobile network using the present LACMA approach will now be described. See, for example, FIG. 1. FIG. 1 is a diagram illustrating exemplary methodology 100 for managing content in a MANET using the present location-aided content management approach. One key concept here is to bind content to certain geographical locations (rather than to nodes) thereby avoiding the issues associated with managing the content when the nodes change locations.

Namely, the main difficulty faced by the existing replication schemes is that their placement process is highly dependent on the network topology, so that the resulting placement quickly becomes obsolete by the node mobility which continues altering the topology, thus adding unmanageable complexity. This challenge is addressed herein by taking a novel location-based approach with help from Global Positioning System (GPS)-enabled mobile devices to decouple the node mobility and the corresponding topology dynamics, thus streamlining the placement and its maintenance procedure.

The MANET in this example contains a plurality of nodes, such as cell phones, PDAs, laptop computers, etc. which can communicate and exchange data wirelessly with one another. A generic apparatus that can represent one of the nodes is given in FIG. 16, described below. The nodes can retrieve their current positioning data from global positioning system (GPS) and/or indoor positioning system as is known in the art.

In step 102, one or more virtual layers of geographic grids are constructed on the physical MANET area (i.e., one virtual layer in the case of only one content and multiple virtual layers in the case of multiple contents). The term "virtual" as used herein refers to logical cells on top of a physical location. The physical location, in this case the physical MANET area, is defined either (i) statistically, e.g., an office building or school campus with deterministic operation area, or (ii) dynamically, e.g., each node periodically updates its location to a centralized server, and the server computes the MANET coverage and broadcasts back to every node. Each virtual layer consists of a plurality of same-sized virtual cells.

In step 104, for each layer of the grid, an identical set of contents is bound/placed to each cell on it, such that those binding contents are contained in each cell (i.e., at least one node in the cell has a copy of the content bound to that cell, and every copy is treated as original and there can be more than one copy). Thus, in this manner, content is bound to a certain geographical location. Different layers are assigned different disjoint sets of contents (i.e., a set of content assigned to the cells in a given one of the layers is different from a set of content assigned to the cells in all of the other layers), and may have different-sized grids according to the number of contents assigned to the layer and/or a popularity of the content assigned to the layer.

Step 104 is further described by way of reference to the following non-limiting example. Say for example that there are 10 contents, $c_1, c_2 \ldots c_{10}$, and there are 3 layers in the grid, L1, L2 and L3. Say, $c_1, c_2, \ldots c_5$ is assigned to L3, $c_6$, $c_7$ and $c_8$ is assigned to L2, $c_9$ and $c_{10}$ is assigned to L1. Then $\{c_1, c_2, \ldots, c_5\}$ is the set of content for L3, and $\{c_6, c_7, c_8\}$ is the set of content for L2, and $\{c_9, c_{10}\}$ is the set of content for L1. It is assumed, according to the present techniques, that the unit of content is given/defined by the particular application at hand. By way of example only, for a given video file, one application (developed by Company A) might treat the whole video file as one content, while another application (developed by Company B) might divide the video file into multiple files (multiple contents).

Figure 16:
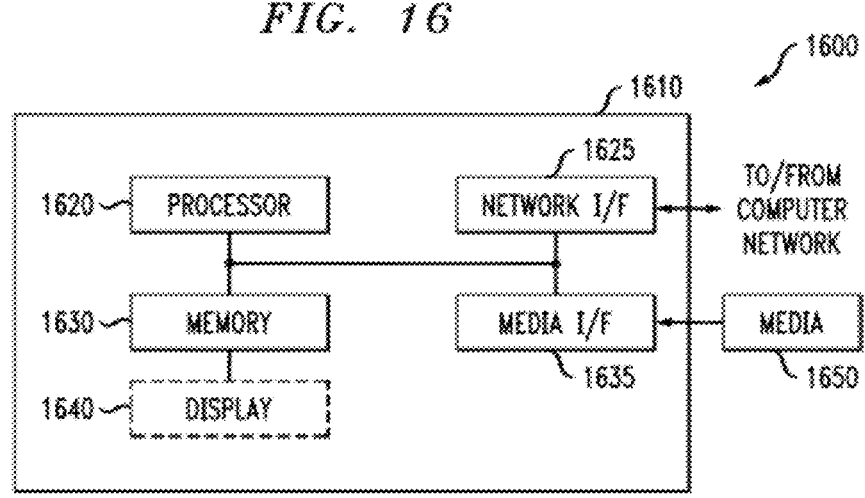
FIG. 16 is a diagram illustrating an exemplary apparatus for performing one or more of the methodologies presented herein according to an embodiment of the present invention.

The steps of methodology 100 may be performed by a network server. By way of example only, a network administrator can provide an area of the operating field and that area combined, for example, with data regarding content popularity can be used by the server, given the present teachings, to create the virtual grid structure and bind content to the grid. An exemplary apparatus that can serve as a network server to perform the steps of methodology 100 is shown in FIG. 16, described below. The virtual grid structure can be pre-loaded to each of the nodes (or obtained by each node from a centralized location). The nodes are then responsible for maintaining the content at the specified location. For example, in a campus environment, the administrator will define the cell according to the content popularity, and put the cell information into a web-server. The web server will then construct the virtual grid structure. When a node wants to use the virtual cells, it will first obtain the cell information from the web server. After that, the node only needs to read its location thru GPS/indoor positioning for checking to which cells the content the node has belongs.

Figure 2A:
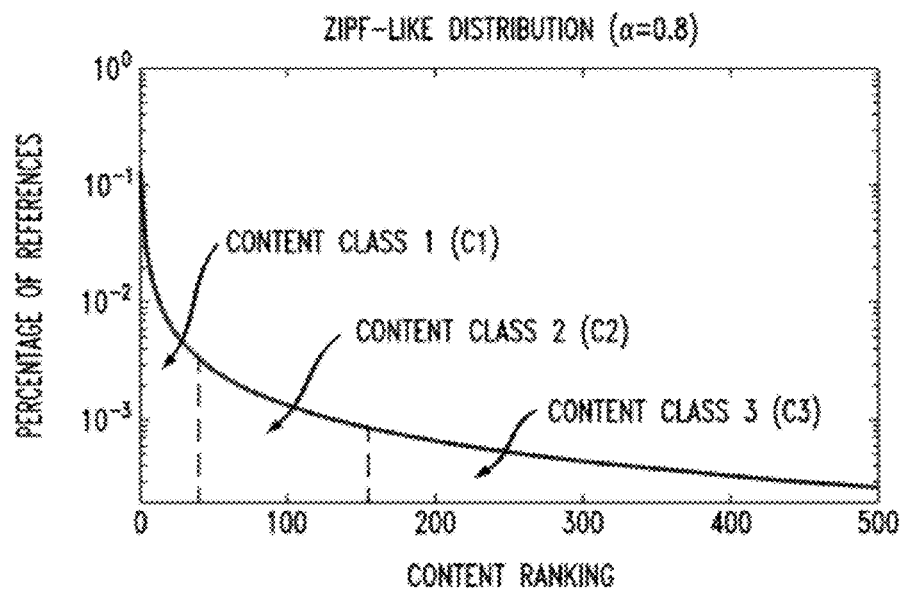
FIG. 2a is a diagram illustrating an exemplary Zipf-like content popularity distribution with three layers of grids according to an embodiment of the present invention.
Figure 2B:
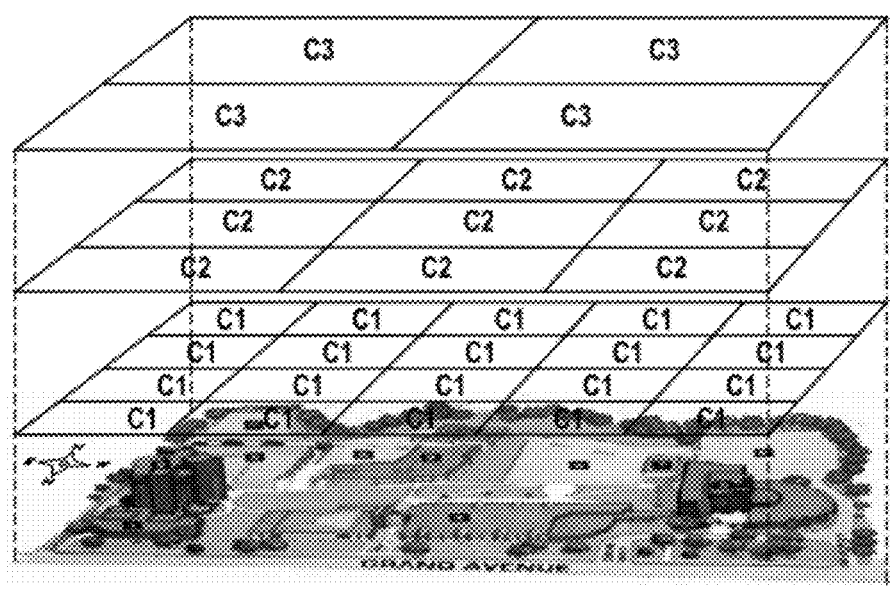
FIG. 2b is a diagram illustrating the placement of content classes 1, 2 and 3 from FIG. 2a according to an embodiment of the present invention.

FIGS. 2a and 2b show an illustrative example of the location-binding placement with three layers of grids. It is noted that the underlying binding philosophy is somewhat analogous to that of the traditional computer memory hierarchy of "place popular items closer" in the sense that a small-sized grid layer and a large-sized grid layer correspond to the fast-but-small CPU cache and the slow-but-large hard disk respectively. Specifically, FIG. 2a is a diagram illustrating an exemplary Zipf-like content popularity distribution 200 with three layers of grids. In distribution 200, content ranking is plotted on the x-axis and percentage of references is plotted on the y-axis. Three content classes 1, 2 and 3 are shown. α, the value of the exponent characterizing the distribution, is 0.8 in this example. FIG. 2b is a diagram 202 illustrating the placement of content classes 1, 2 and 3 from FIG. 2a.

Figure 3:
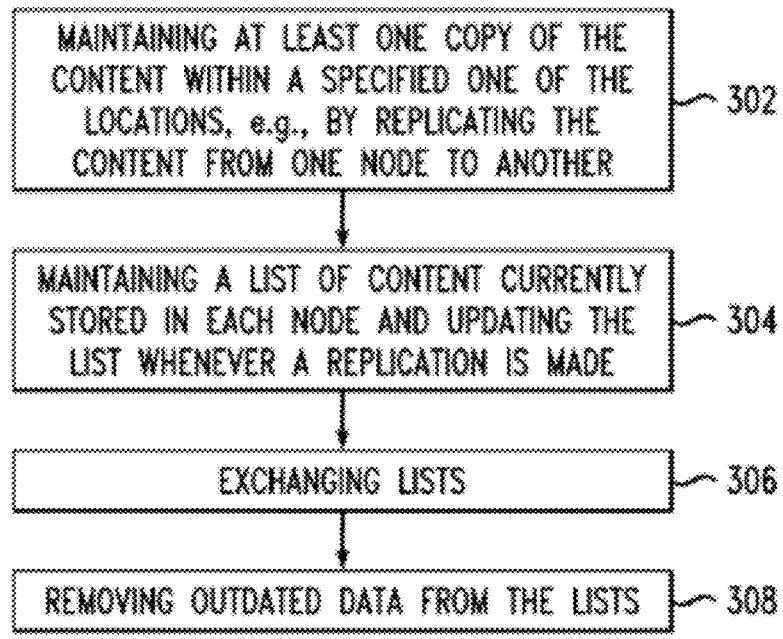
FIG. 3 is a diagram illustrating an exemplary methodology for binding content to a specific geographical location according to an embodiment of the present invention.

As highlighted above, the present techniques involve binding content to a specific geographical location. This is accomplished by having the nodes, on which the content is stored, maintain (through push operation, see below) a copy of the bound content at the specific location. FIG. 3, for example, is a diagram illustrating an exemplary methodology 300 for binding content to a specific geographical location. According to an exemplary embodiment, the steps of methodology 300 are performed by the nodes. An apparatus that can serve as one or more of the nodes is provided in FIG. 16, described below. In step 302, at least one copy of the content is maintained within (stored on) a specified one of the cells. Namely, the mobile nodes move freely around on top of the layers of content-binding grids (see, for example, FIG. 15, described below). When leaving the current cell (of any layer), a node x is responsible to replicate, if necessary, certain location-binding content(s) that x currently holds and hand the copies over to the remaining neighboring nodes in the cell, in order to maintain the location-binding content placement (each cell should contain at least one copy of each of its binding contents, i.e., stored by a node currently in that cell). This replication process is referred to herein as a 'push' operation, i.e., it is a localized (single hop) event where each node makes the decision whether to replicate its contents with another node in the same cell based on its current location along with the binding contents it holds.

The proposed location-binding placement benefits from the layers of regular grids to provide coarse-grained bound for content availability, where a node can reach any contents within its current cell of a certain layer (whose size is proportional to the access frequency), thus effectively reducing the expected content retrieval time. In addition, the query search traffic can be significantly mitigated by limiting the propagation range within the corresponding cell (otherwise flooded throughout the network), since there exists a copy of the requested content stored by some node(s) in the cell with high probability.

In order to make this solution work properly, the following issues will be addressed. First, how the layers of grids are constructed (e.g., determining the number of layers and their corresponding cell size). Second, how the contents are classified and the contents are bound into the layers of grids (i.e., which contents to which layers). And third, how each cell's location-binding contents can be maintained in the face of node mobility. These issues are now addressed and the complete architecture and its protocol design are now presented in detail.

The design of the present location-aided content management approach (LACMA) is now presented via two novel techniques: location-binding content placement and location-based content maintenance. First, multiple-resolution geographical regions are defined so that popular contents can always be found in near locations while less popular contents are still available but not as densely replicated as popular ones. Second, a probabilistic proactive content replication mechanism is designed that carefully and efficiently maintains the content population without requiring centralized coordination or global knowledge. The location-binding content placement technique is described first. The placement goal of the present location-based design is to minimize the expected access cost to reach contents in the network and hence, the general replica placement objective of Equation 1 above is first adopted to the location-based framework.

With regard to the location-binding placement objective, in order to eliminate the dependency on the actual network topology from the placement procedure, the present techniques aim to bound $d(x,c_i)$, the distance from any node x to any content c that belongs to the same content class l. The basic idea is to place contents with similar popularity into a cell of the same layer l of a virtual square grid, rather than trying to optimize $d(x,c_i)$ directly such that:

$$\sqrt{2}\cdot S_l \geq d(x,c_i), \forall c_i \in C_l, \quad (2)$$

wherein $C_l$ represents a content class l, and $S_l$ is the width of a square cell in layer l. For clarity of presentation, the Euclidean distance is used directly as the distance metric, which can be readily converted to other measures, e.g., hop count. See, for example, S. De, "On hop count and euclidean distance in greedy forwarding in wireless ad hoc networks," *IEEE Communications Letters*, vol. 9, no. 11 (2005), the contents of which are incorporated by reference herein. Note that the l.h.s in Equation 2 above is the maximum possible distance within a cell (i.e., diagonal length). Thus, the cell size of layer l provides an upper bound on the distance to reach any items of content class l, determining the expected retrieval time for the contents associated with the layer. This high-level placement idea is to place more popular contents into a layer of smaller cells, while scarcely popular ones go to a layer of larger cells. This idea is driven by the fact that total data access cost is defined as distance to contents multiplied by their relative access frequency (see Equation 1 above).

With regard to content popularity, typically demand for different contents follows different rates, reflecting different content popularity. It is assumed that the content access rate follows Zipf-like distribution generally considered as representative of content popularity, while the present placement methodology can be naturally extended to other cases such as uniform distribution. In the Zipf-like distribution, the access probability of the $i^{th}$ ($1 \leq i \leq m$) content item is represented as follows:

$$P(i; \alpha, m) = \frac{\frac{1}{i^\alpha}}{\sum_{z=1}^{m} \left(\frac{1}{z^\alpha}\right)}, \quad (3)$$

wherein $\alpha(0 \leq \alpha \leq 1)$ is the value of the exponent characterizing the distribution. When $\alpha=1$, it follows the strict Zipf distribution; when $\alpha=0$, it follows the uniform distribution. FIG. 2a shows a typical content popularity distribution, which follows Zipf-like distribution with $\alpha=0.8$ based on real web trace studies. See, for example, L. Breslau et al., "Web caching and Zipf-like distributions: evidence and implications," *IEEE INFOCOM* (1999), the contents of which are incorporated by reference herein. Note that in FIG. 2a the y-axis is in log scale, which signifies that the actual access frequency of popular contents is much higher than others. It is assumed that the content popularity information is available to the network operator, which can be estimated/obtained by prior statistics. For the unknown case, one can instead use the uniform distribution until collecting enough statistics.

The location-binding content placement problem is formulated as follows: given the (i) content popularity distribution P(i;a,m) and network characteristics, (ii) node count and (iii) whole area size, it is desirable to minimize the total data access cost using as few layers of grids as possible (i.e., an arbitrarily large number of layers of grids may help classify contents with finer granularity, which however involves the increased maintenance cost), and determine the content classes and their corresponding grid cell size. This problem is modeled as a dynamic programming problem. Without loss of generality, it is assumed that content $c_i$ is the $i^{th}$ popular item in a set of contents C (it simply involves a reindexing of the contents in C). Each content class $C_l (C_l \subset C)$ represents a contiguous set of contents in terms of their popularity ranking.

Taking into account the overlapping property of layers, $\delta_l$ is used to denote the proportion of the storage space that a node can use up for content class l, such that $\Sigma_l \delta_l = 1$. $\delta^*$ is the smallest assignable proportion and $\delta^* = 0.01$. Given a content class $C_l$ represented by indices (a,b) of its most popular content $C_a$ and the least popular one $c_b$, respectively, $\psi(a,b,\delta_l)$ can be estimated, the average access cost to reach the contents that belong to class $C_l$:

$$\psi(a, b, \delta_l) = \sqrt{2} \cdot S_{(a,b,\delta_l)} \times \int_a^b P(x; a, m) dx, \quad (4)$$

wherein $S_{(a,b,\delta_l)}$ is the (smallest possible) width of a square cell (by which the whole area is divisible) that can accommodate all contents of class l such that the following condition holds:

$$\frac{n}{B^2} \cdot S_{(a,b,\delta_l)}^2 \cdot \omega \cdot \delta_l \geq \sum_{i=a}^{b} \text{size}(c_i), \quad (5)$$

wherein n is the total number of nodes, B is the width of the whole square area, and $\omega$ represents the average storage capacity of each node. The above condition prevents the over-assignment of contents beyond the aggregate storage capacity assigned for content class $C_l$ within a cell. It is assumed that there is a relatively uniform node density across the network. If it is not the case, $S_{(a,b,\delta_l)}$ should be chosen more conservatively.

It is again noted that the number of layers reflects a tradeoff between content class granularity and maintenance cost. To allow any number of layers while taking the tradeoff into consideration, a parameter K is used that represents the penalty for adding a new layer. This multiplier K captures the tradeoff, and by tuning K, the use of additional layers can be penalized to a greater or lesser extent.

The total cost of the content placement is now defined to be a sum of the following terms: (i) the number of layers of grids (i.e., number of content classes), times a given multiplier K>0; (ii) for each layer of a grid, the total access cost (upper bound) to reach contents of the class (according to Equation 4).

Let $\Phi(j, \delta)$ denote the optimal cost by the present location-based placement for contents $c_1, \ldots, c_j$ with using $\delta$ available storage proportion ($\Phi(0,0)=0$ as a boundary case). Then it is possible to solve the placement problem by using the following dynamic programming method to compute $\Phi(j,\delta)$ recursively:

$$\Phi(1,\delta) = \sqrt{2} \cdot S_{(1,1,\delta)} \times P(1; \alpha, m) \quad (6)$$

$$\Phi(j, \delta*) = \sqrt{2} \cdot S_{(1,j,\delta*)} \times \int_1^j P(x; \alpha, m) dx \quad (7)$$

$$\Phi(j, \delta) = \min_{\substack{1 \leq i \leq j \\ 0 \leq \hat{\delta} \leq \delta}} \left( \psi(i, j, \hat{\delta}) + K + \Phi(i-1, \delta - \hat{\delta}) \right) \quad (8)$$

Expression 6 states that if there is only one content, it results in a single layer with its cell size mainly determined by $\delta$. The unit of content (i.e., so as to determine what constitutes a single content) depends on the particular application at hand. By way of example only, a web application might define web objects each as one unit of content. One way to decipher contents versus a set of contents can be based on the number of contents at hand. For example, an application can treat 3 image files as 3 different contents, then the number of content is 3. According to this example, the phrase "one content" thus means that the application only cares about one content, e.g., 1 image file. By comparison, a set of all 3 image files would constitute a set of contents. Expression 7 denotes that when $\delta = \delta^*$, all the unassigned contents go to a single layer, whose cell size depends on the aggregate of those contents. The recursive Expression 8 can be explained by noting that an optimal solution $\Phi(j, \delta)$ can be obtained by identifying the last content class C(i,j) with $\hat{\delta}$ storage proportion—plus an additive penalty K for this layer—together with optimal solution $\Phi(i-1, \delta-\hat{\delta})$ for the remaining contents and storage space.

The complexity of the above-described dynamic programming method is $O(m^2 q)$, where m is the total number of contents, and $q=1/\delta^*$. The running time of $O(m^2 q)$ is achieved by computing $\psi(i, j, \delta)$ in a carefully controlled manner (i.e., $\psi(i, j, \delta)$ is computed for all pairs (i, j) where j−i=1, then for all pairs of j−i=2, then j−i=3, and so forth, so that $\psi(i, j-1, \delta)$ can be used as the ingredient to determine $\psi(i, j, \delta)$ in constant time). It is also a polynomial-time method due to the fact that q is bounded by a polynomial function of m.

Once building up the solutions $\Phi(j,\delta)$ for all j and $\delta$ by filling them in the array entry M[j,$\delta$], the array entry M[j,$\delta$] can be used for the optimal location-binding content placement. The resulting placement can be obtained via the content placement methodology 400 outlined in FIG. 4, which traces back through the array M to find the content assignment in an optimal solution. Note that each recursive call is associated with a certain layer l, and records the output into global variables of layer l. The end result of the methodology includes (i) the number of layers and their cell size, (ii) the binding contents, and (iii) the storage space partition that each node can use up for each content class.

To obtain insight into how the Zipf parameter α and the penalty parameter K affect the outcome of content placement methodology 300, the behavior of the placement result is examined while varying these parameters. FIG. 5 is a graph 500 illustrating the number of layers that methodology 400 generates against the input values of α and K, for a network instance of $B^2=2.5\times2.5$ km$^2$ square area, m=1000 contents, n=300 nodes, and ω=30 memory slots at each node. It can be seen that at low values of K, the layer-addition penalty becomes marginal enough to have a large number of layers, while the opposite is true as K increases. It is also observed that as α approaches zero, the trend settles in a single layer (irrespective of K>0), which demonstrates that the method naturally adapts to the case of uniform popularity (the Zipf function follows the uniform distribution when α=0). Intuitively, all the contents with uniform popularity should be bound into a single layer because multiple content classes only increase maintenance costs without any benefit, since all the items have the same access frequency.

Figure 6:
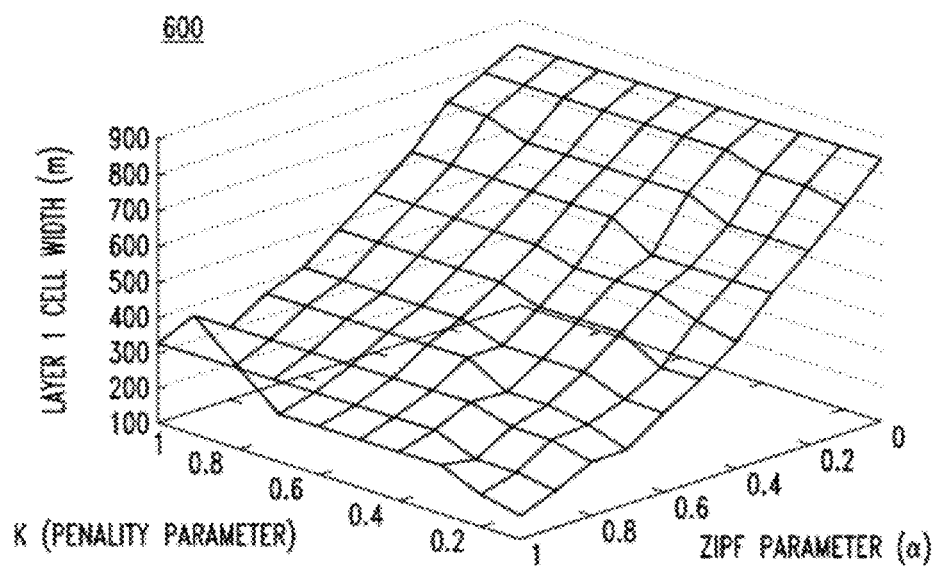
FIG. 6 is a graph illustrating the corresponding cell width of layer 1 of FIG. 5 according to an embodiment of the present invention.
Figure 7:
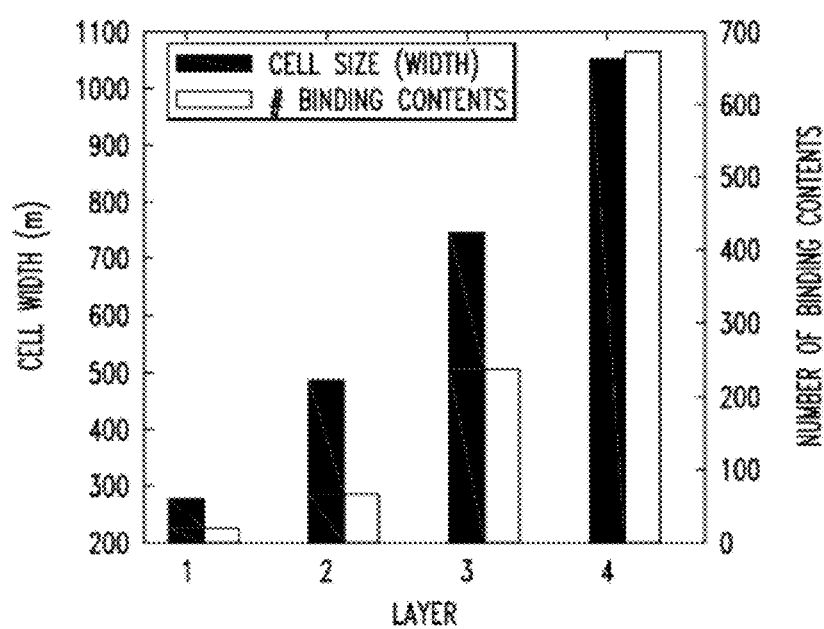
FIG. 7 is a graph illustrating detailed placement results from an exemplary case of the Zipf parameter $\alpha$=0.8 and the penalty parameter K=0.3 according to an embodiment of the present invention.

FIG. 6 is a graph 600 illustrating the corresponding cell width of layer 1 (measured in meters (m)) in the same setting. Notice that when α=0, the cell size is the largest, $830\times830$ m$^2$, with only a single layer (see FIGS. 2a and 2b), thus resulting in nine cells in a 2.5×2.5 km$^2$ area. On the other hand, when α=0.8 for example, the cell size becomes as small as $280\times280$ m$^2$ (i.e., 81 cells in layer 1), while having multiple layers each with different cell size. FIG. 7 is a graph 700 illustrating detailed placement results from an exemplary case of α=0.8 and K=0.3. Note that the cell size (measured in meters) of layer 4 (1,050 meters (m)) is even larger than the case of α=0 (830 m). This is due to storage space partition. When α=0, every node can use all of its storage slots for a single layer. However, with multiple layers, the storage is partitioned for each layer, thus requiring more nodes to meet a certain aggregate storage capacity (i.e., increasing the cell size).

As highlighted above, two novel approaches can be used in accordance with the present LACMA techniques, namely, location-binding content placement and location-based content maintenance. Location-based content maintenance will now be described.

The goal of the location-based content maintenance is to determine whether to push the content or not (i.e., hand a copy over to the remaining neighboring nodes) when leaving the current cell, in order to maintain the replica placement given above. The goal is to retain the location-binding placement in the face of mobility, i.e., to keep each cell containing at least one copy of each of its binding contents with high probability, while minimizing the cost of push operations.

For the sake of clarity, the description is focused on the push decision of a single content in a certain layer, as it is an identical procedure which every node performs independently on each content it holds. Ideal, straightforward push approaches are first described followed by a description of a proposed practical, cost-effective solution.

Figures 8, 9:
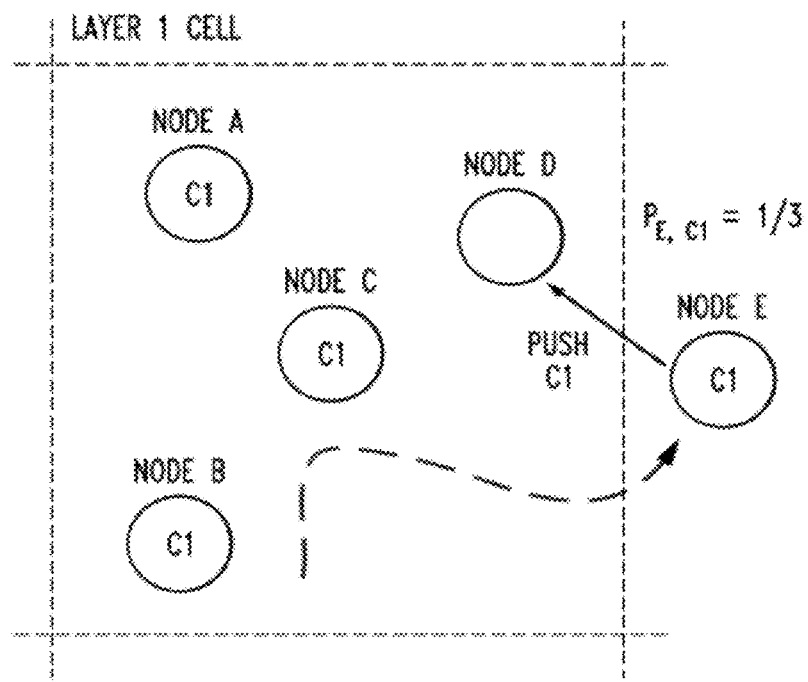
FIG. 8 is a diagram illustrating an example of a probabilistic push operation according to an embodiment of the present invention.
FIG. 9 is a diagram illustrating a cache table for the exemplary probabilistic push operation shown in FIG. 8 according to an embodiment of the present invention.

In this first, ideal case, perfect synchronization is assumed. Suppose that node x leaves its current cell of layer l with its binding content $c_i$. To minimize the cost of push operations while maintaining the placement, the ideal case would be to push content $c_i$ only when node x sees that the other nodes do not hold a copy of $c_i$ in the cell. As an example see FIG. 8. FIG. 8 is a diagram 800 illustrating an example of a probabilistic push operation. Only a single content $c_1$ is shown for ease of depiction. It is notable that Node E in this case is unaware that Node A also holds content $c_1$. In FIG. 8, where node E leaves a cell of layer 1 with binding content $c_1$, the cell still retains $c_1$ even if E exits without pushing $c_1$ (i.e., other nodes A, B and C also store $c_1$ in the cell). In this example, node E knows node B and C also hold $c_1$ (since the path of node E passes nodes B and C). If node E also knew that node A holds $c_1$, the probability P{E, $c_1$} equals ¼. The suppression of pushing $c_1$ (in this case to node D) by E in such a situation can possibly lead to the maintenance of the location-binding placement at minimal push cost. However, it requires the global knowledge of replica information among all members in the cell, i.e., all nodes have the same view on who holds which contents in a real-time manner. Such perfect coordination is hard, sometimes even nonfeasible, to achieve in distributed environments.

FIG. 9 is a diagram illustrating a cache table 900 for the exemplary probabilistic push operation shown in FIG. 8. Cache table 900 relates to Node E's cached contents. Each node (in this case Nodes A-D) would maintain a similar cache table.

Alternatively, instead of the ideal case for perfect synchronization, a more practical technique involving a blind push may be employed. Namely, in the absence of any global information, perhaps the most straightforward way is to blindly push content $c_i$ whenever node x leaves its current cell. This simplistic approach, however, has two major drawbacks: (i) content redundancy (in FIG. 8, node D will also store $c_1$) which wastes storage space that otherwise can be used for storing other contents, and (ii) push cost is excessive (i.e., the push operation consumes a lot of the network bandwidth and degrades the performance of normal network traffic). Although push operation is a single-hop data transmission, such blind push can overload the network at the cell border. For example, by reference to FIG. 2b, Layer 1 has 20 cells $C_1$. The borders between each $C_1$ cell are the cell borders.

As a compromise between the above two extreme approaches, presented herein is a simple but effective technique called "probabilistic push" that exploits the local information collected by each node to contribute to the joint maintenance effort while reducing the unnecessary push operations as much as possible. The idea is that if node x can estimate the current number of copies of content $c_i$ in the cell, it only needs to push $c_i$ with probability of inverse proportion to the estimated number, thus collectively achieving the cell maintenance efficiency and sharing the push responsibility with others who also hold $c_i$ in the cell.

The "push responsibility" of node x for content $c_i$ is denoted with $P_{x,c_i}$, such that x uses the push responsibility ($0<P_{x,x_i}\leq 1$) as the probability to push $c_i$ when leaving the cell. Note that, for the blind push case, every node holding $c_i$ has full responsibility to push:

$$P_{x,c_i}=1, \forall x\in N(c_i), \quad (9)$$

wherein $N(c_i)$ is a set of nodes who store $c_i$ in the cell. For probabilistic push, one may ideally want the perfect discovery:

$$\sum_{x\in N(c_i)} P^{\hat{}}_{x,c_i} = 1 \Rightarrow P^{\hat{}}_{x,c_i} = 1/|N(c_i)|, \quad (10)$$

wherein $P_{x,c_i}\hat{}$ is the ideal value of $P_{x,c_i}$. The above case means that on average only one node (among the ones holding $c_i$ in the cell) will push $c_i$ when exiting, so that the placement can be maintained with minimum effort. However, as mentioned previously, it is difficult to obtain such an accurate view without perfect coordination which is too costly to be used in practice.

From a cost-effective approach, the above objective would be pursued from each individual node x's local point of view:

$$\sum_{x \in N_x(c_i)} P_{x,c_i} = 1 \Rightarrow P_{x,c_i} = 1/|N_x(c_i)|, \quad (11)$$

wherein $N_x(c_i)$ is a subset of $N(c_i)$ that x is aware of. Since each node x has only its own local point of view, $|N(c_i)| \geq |N_x(c_i)|$. Considering that $\Sigma_{x \in N(c_i)} p_{x,c_i} = \Sigma_{x \in N(c_i)} 1/|N_x(c_i)|$, the following relation exists:

$$|N(c_i)| \geq \sum_{x \in N(c_i)} P_{x,c_i} \geq \sum_{x \in N(c_i)} P\hat{x}, c_i = 1. \quad (12)$$

Note that the second term on the left (i.e., $$\sum_{x \in N(c_i)} P_{x,c_i}$$

can be interpreted as the expected number of push operations for $c_i$ in probabilistic push, while the leftmost and the rightmost terms correspond to the blind push and the perfect coordination cases, respectively.

To make the local view $N_x(c_i)$ as close to the real $N(c_i)$ as possible, two features are employed: (1) query listening and (2) cache-list exchange with nodes encountered in the cell. Such information is processed/discarded by first checking the cell ID that is included in the message header. In step 304 of methodology 300, a list of content currently stored in each node is maintained and the list is updated whenever a replication is made. For example, when a query request for $c_i$ generated by node y is received in the same cell, each node x in that cell which holds $c_i$ updates its view, i.e., $N_x(c_i) = \{y\} \cup N_x(c_i)$, since a new copy of $c_i$ is going to be cached at y—responded by x or others. Note that every node is able to listen in on any query messages originated inside the cell, as query propagation range covers (at least) the corresponding cell.

In step 306, the nodes within a cell exchange lists with one another. Namely, every node y broadcasts the list of content IDs in the cache when encountering or discovering new node(s) in the cell (e.g., the discovery process can be done in different modules, such as routing update or broadcast) or periodically (at a regular, repeating time interval such as every ten minutes), e.g., along with the HELLO neighbor discovery message. See, for example, C. E. Perkins et al, "Ad hoc on demand distance vector (AODV) routing protocol," IETF Internet Draft (January 2002), the contents of which are incorporated by reference herein. Receiving node x adds y into $N_x(c_i)$ if y has $c_i$. Maintaining $N_x(c_i)$ prevents double counting of nodes encountered multiple times. It is noteworthy that the size of the cache-list message still remains small, as it only includes a node ID (4 bytes), content IDs (2 bytes each), plus header information (i.e., given the memory capacity of each node from one percent to five percent of the number of contents (e.g., 1,000) in the network (see, for example, Tang), the message size is up to 120 bytes).

For both cases, node x also records the time that y is added/updated in $N_x(c_i)$. This information is used in step 308 to clear y from $N_x(c_i)$ after a given validity duration $T_v$, thus invalidating potentially outdated information (e.g., y may drop $c_i$ or leave the cell). The choice of $T_v$ offers a design tradeoff, namely a larger $T_v$ would lead to a smaller number of push operations at the risk of using obsolete information, and the opposite would be true for small $T_v$. This issue related to the cell size and node mobility will be discussed below.

When leaving the cell, node x pushes $c_i$ with probability $P_x(c_i) = 1/|N_x(c_i)|$ to the remaining neighbor(s) if none of them has $c_i$ (see FIG. 8, described above). Each node uses LRU (least recently used) policy for cache replacement. Once completing the push operation and entering new cell of layer l, node x clears all $N_x(c_i)$ associated with layer l. Note that $N_x(c_i)$ always includes node x itself, thus making $P_{x,c_i} = 1$ when x does not observe any nodes with $c_i$ in the cell.

Now discussed are the effects of cell size and node mobility on the push operation cost. Of primary interest is to study how frequently a node changes its cell (i.e., cell-leaving rate), as this is a necessary condition to trigger the push operation. To simplify the analysis, consider the 2-D random-walk mobility model (see for example, T. Camp et al., "A survey of mobility models for ad hoc network research," Wireless Communications & Mobile Computing (WCMC): Special issue on mobile ad hoc networking (2002), the contents of which are incorporated by reference herein), where each node moves with a constant speed v, in four directions with an equal probability, over a square cell with a width of S.

Figure 10:
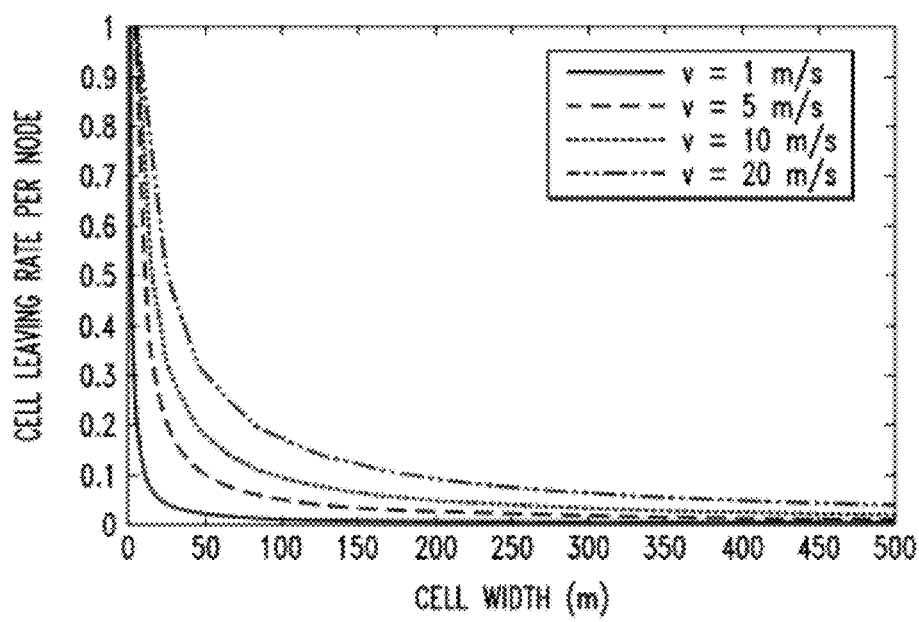
FIG. 10 is a graph illustrating the mean cell-leaving rate (for a single node) varying the cell size with different node speed according to an embodiment of the present invention.

The mean cell-leaving rate λ can be obtained by using an absorbing Markov chain model (see, for example, K. H. Chiang et al., "A 2-D random walk mobility model for location management studies in wireless networks, *IEEE Transactions on Vehicular Technology* (2004), the contents of which are incorporated by reference herein), where a cell is further divided into $\beta = (S^2/v^2)$ area units, such that each time step a node moves into any of four neighboring units with equal probability. Those β units are viewed as transient states (TS), while surrounding $\gamma = (S/v+1) \times 4$ units outside the cell are treated as absorbing states (AS). The transition matrix of an absorbing Markov chain has the following canonical form:

$$P = \left( \begin{array}{c|c} Q & R \\ \hline 0 & I \end{array} \right), \quad (13)$$

wherein Q is a β-by-β (TS→TS) matrix, R is a β-by-γ (TS→AS) matrix, 0 is a γ-by-β zero matrix, and I is a γ-by-γ (AS→AS) identity matrix. The matrix $N = (I-Q)^{-1}$ is called the fundamental matrix for P, then the expected number of steps t before the chain is absorbed is given by:

$$t = Nc \Rightarrow \lambda = 1/t, \quad (14)$$

wherein c is a column vector all of whose entries are 1. The above results are illustrated in FIG. 10, which is a graph 1000 that plots the mean cell-leaving rate (for a single node) varying the cell size (width, measured in meters (m)) with different node speed v (1~20 meters per second (m/s)). Two general trends can be observed, namely that (i) the larger the cell size, the longer the node remains in its current cell (showing exponential-decay-like curves), and (ii) high node mobility leads to the increase of cell-leaving rate (acting like the decay constants).

Now discussed is the push operation cost as it relates to the cell size and the mobility. For a single layer network consisting of h cells, the expected number of push operations $E_p$ through the network in unit time can be expressed as the multiplication of the number of cells h, cell-leaving rate $\lambda$, the mean node count per cell n/h, and the average number of push operations p per cell-leaving node:

$$E_p = h \cdot \lambda \cdot \frac{n}{h} \cdot p = n \cdot \lambda \cdot p. \quad (15)$$

As the total number of nodes n is a given network parameter and p is relatively constant across the cells in the same layer, it is seen that the cell-leaving rate $\lambda$ turns out to be the key factor for $E_p$. Thus, $E_p$ can be estimated for different cell size and mobility patterns by plugging $\lambda$ obtained from Equation 14.

Figure 11:
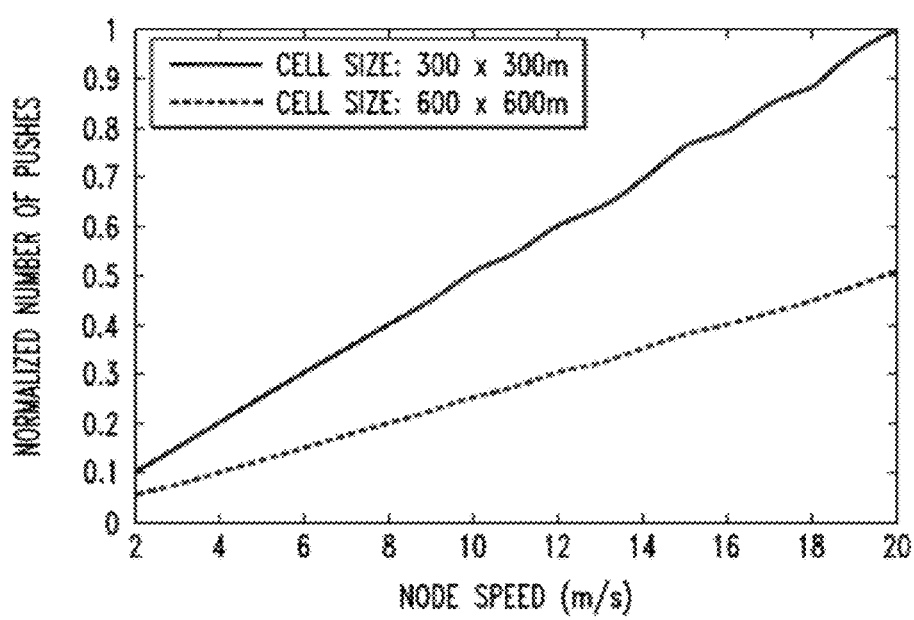
FIG. 11 is a graph illustrating node mobility versus push operations for the worst-case scenario of the blind push scheme according to an embodiment of the present invention.

FIG. 11 is a graph 1100 that plots the above push operation cost: $E_p$ results in the worst-case scenario of the blind push scheme. In graph 1100, node (mobility) speed (measured in m/s) is plotted on the x-axis and normalized number of push operations is plotted on the y-axis. Graph 1100 shows that $E_p$ increases (almost linearly) with node speed, and a small-cell layer has higher $E_p$ (inversely proportional to cell size) than the large one under the same mobility. The above observation indicates that more maintenance cost is paid for the more frequently accessed contents (rather than the rarely requested ones), which indeed conforms to the present binding principle. Recall that the present placement methodology assigns a small number of popular items to a layer of small cells. It is emphasized that this is a worst-case analysis, and the probabilistic push is much more cost-effective in practice (as shown using simulations below), which is however very difficult to quantify via numerical analysis.

Figures 12, 13:
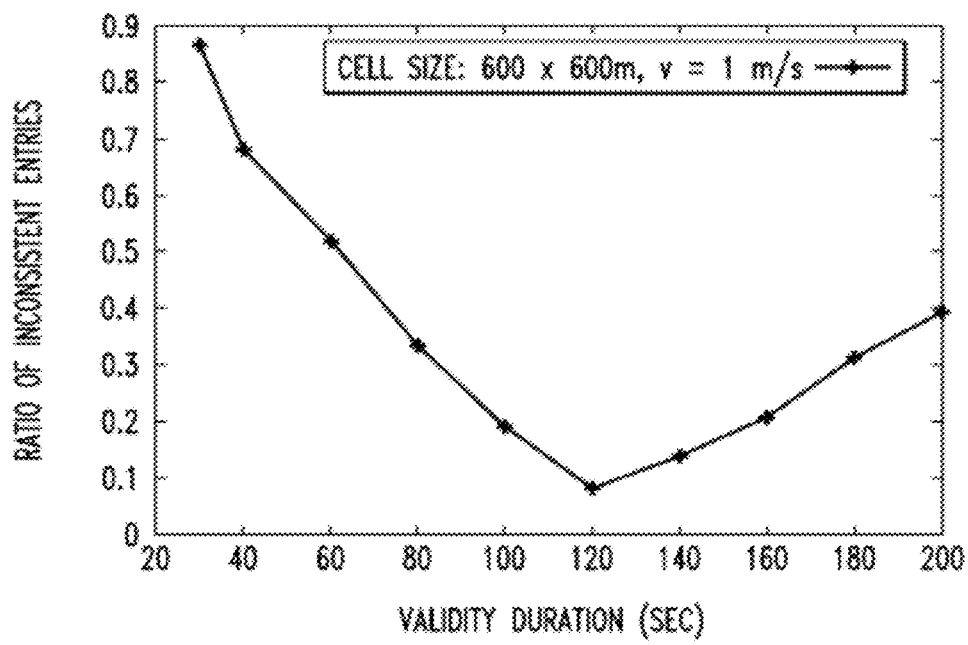
FIG. 12 is a graph illustrating inconsistent entries versus validity duration according to an embodiment of the present invention.
FIG. 13 is a table summarizing a list of default simulation parameters and ranges according to an embodiment of the present invention.

The validity duration $T_v$ for keeping an encountered node's information should be chosen to account for the cell size and the mobility. If $T_v$ is too small, a large amount of information is wasted (otherwise useful), e.g., deleting a node y from the list, but y is still in the cell. On the other hand, a too large $T_v$ leads to an outdated view on the cell. To find a balancing value, the ratio of the number of inconsistent entries (against the actual case) is measured as a function of $T_v$. It is noted that the result will depend on the mobility model or traces. As an example, FIG. 12 is a graph 1200 illustrating inconsistent entries versus validity duration. In graph 1200, validity duration (measured in seconds (sec)) is plotted on the x-axis and ratio of inconsistent entries is plotted on the y-axis. Specifically, graph 1200 illustrates the above ratio of inconsistent entries results using the random waypoint mobility with average node speed 1 m/s on 600×600 square meter (m²) cells. This specific example gives a clearer idea of how $T_v$ should be chosen ($T_v$=120 seconds (s) in this case), and such fine-tuned values are used in the present simulations. Note that $T_v$ depends on the actual mobility pattern in a given network. It is recommended that the network operators should utilize their network mobility traces to determine the suitable values for $T_v$.

The performance of the present LACMA was evaluated through the network simulator ns-2. The focus was to measure the benefits of LACMA and its associated cost, by comparing with other representative approaches over a wide range of different scenarios and parameters.

For a simulation model, a group of mobile nodes moving in a physical site of a 2.5×2.5 km² area was considered. Each node was equipped with a standard 802.11 interface, and a communication range of up to 250 m. Various network scenarios were simulated based on the following parameters: (i) the number of nodes in the network, (ii) mobile node speed, (iii) memory capacity on each node, (iv) content popularity distribution, (v) mean query generation time. For each test suite one of those key parameters was varied while the others were kept at their default values. FIG. 13 is a table 1300 which summarizes a list of the default simulation parameters used and their ranges.

The random waypoint movement model (see, for example, J. Broch et al., "A performance comparison of multi-hop wireless ad hoc network routing protocols," ACM MOBI-COM (1998), the contents of which are incorporated by reference herein) was employed for node mobility, where 2 m/s was set as the default maximum node speed (i.e., pedestrian walking speed). For simplicity, each content was assumed to be of unit size (one memory slot) and thus, the cache size is presented in terms of the number of cache slots at each node. The time interval between two consecutive queries from a node, referred to as the query generation time, follows exponential distribution with mean value from 10 to 60 s. The content access pattern is based on Zipf-like distribution (see Equation 3) with the default $\alpha$=0.8 and varying from 0 (uniform distribution) to 1 (strict Zipf distribution). In each run, the statistics of 1-hour simulation time were collected. The results were averaged over 10 runs.

As a benchmark, the LACMA was compared with three other reference methods, HybridCache (see, for example, Yin), Hamlet (see, for example, Fiore), and CGA (see, for example, Tang). HybridCache is a standard opportunistic caching technique used to compare with several previous works. HybridCache allows nodes on the data path to cache the relaying item if the relaying item's size is small, otherwise to cache the data path. The HybridCache parameters were set such that the data size always results in data caching according to Fiore. Hamlet is another caching technique, whose goal is to save storage space while achieving content diversity with neighboring nodes. Hamlet estimates the cached items in the neighborhood so that each node can drop the redundant items in its cache. CGA, on the other hand, is a 2-approximation centralized offline replica placement method (the currently best known approximation ratio) for non-mobile networks. With global knowledge of the network, CGA allocates each item to the best possible node in a greedy manner. The snapshot results obtained from CGA for the evenly-placed node case are presented, and use the CGA results as the ideal lower bound in a mobile environment. It is notable that since the computation complexity of CGA is quite high, a comparison with CGA's performance can only be done in a relatively small setting, and those results are presented separately.

The results of the simulations are now described. The distances to reach the requested contents in terms of the number of hops between the requesting nodes and the actual responding nodes were studied. FIG. 14a is a graph 1400a that plots the average hop count resulting from the three different schemes. In graph 1400a, number of nodes in the network is plotted on the x-axis and average number of hops is plotted on the y-axis. It can be seen that LACMA offers nearly a 20 percent to 35 percent decrease in hop count as compared to HybridCache and a 40 percent to 45 percent decrease in hop count as compared to Hamlet. It is noted that such hop count reduction (e.g. 4→3 hops) is, in fact, quite significant from the MANET perspective, and many studies (see, for example, Z. Fu et al., "The impact of multihop wireless channel on TCP throughput and loss," IEEE INFOCOM (2003) and J. Li et al., "Capacity of ad hoc wireless networks," ACM MOBICOM (2001), the contents of each of which are incorporated by reference herein) have shown that the achievable throughput drops rapidly with the hop count of the transmission in multihop wireless networks. It was also observed that LACMA performs around one hop worse than CGA (see FIGS. 14e, 14f and 14g). FIGS. 14e, 14f and 14g are graphs 1400e, 1400f and 1400g, respectively, illustrating the present LACMA approach versus a static-offline scheme. In graph 1400e, number of nodes in the network is plotted on the x-axis and average number of hops is plotted on the y-axis. In graph 1400f, cache size (slots) is plotted on the x-axis and average number of hops is plotted on the y-axis. In graph 1400g, the Zipf parameter α is plotted on the x-axis and average number of hops is plotted on the y-axis. The intention here is to provide the theoretical lower bound for the static network (obtained via an offline methodology), and to give an insight of how close/far LACMA deviates from such bound rather than a direct comparison.

Figure 14B:
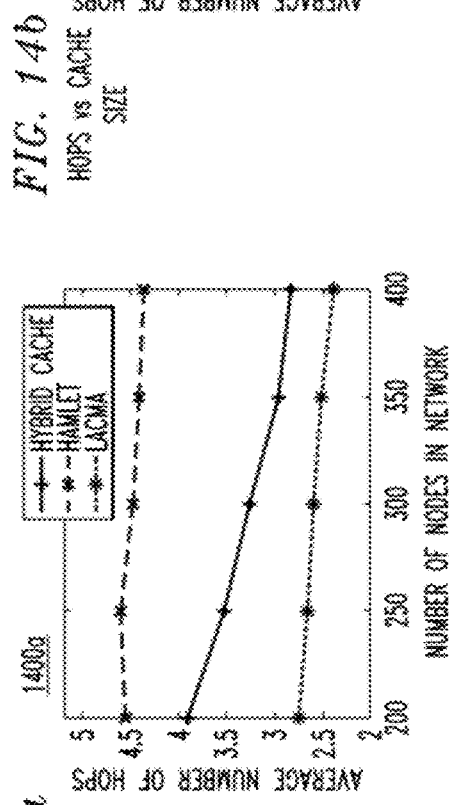
FIG. 14b is a graph illustrating hops versus cache size according to an embodiment of the present invention.
Figure 14D:
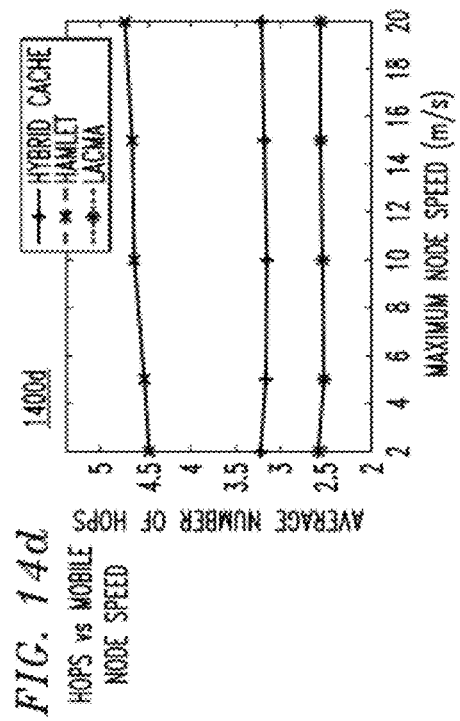
FIG. 14d is a graph illustrating hops versus mobile node speed according to an embodiment of the present invention.
Figure 14A:
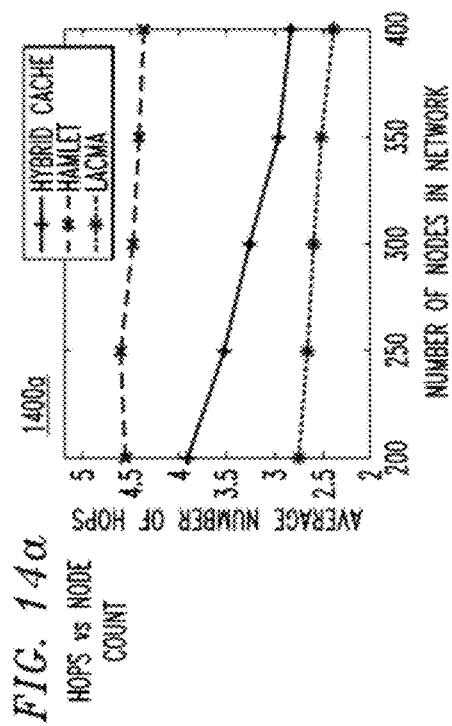
FIG. 14a is a graph illustrating hops versus node count according to an embodiment of the present invention.

FIG. 14b is a graph 1400b that plots the hops versus cache size. In graph 1400b, cache size (measured in number of slots) is plotted on the x-axis and average number of hops is plotted on the y-axis. In FIG. 14b, the cache size of each node is varied from 5 to 30 slots that correspond to 0.5 percent and 3 percent of the total number of contents, respectively. It is seen that LACMA consistently outperforms the other two schemes, even when the cache size is small. This result suggests that the storage space partition in LACMA efficiently uses the cache memory.

Figure 14C:
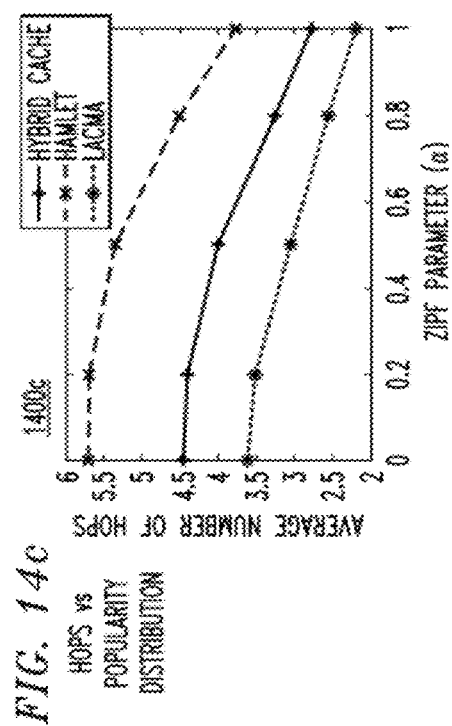
FIG. 14c is a graph illustrating hops versus popularity distribution according to an embodiment of the present invention.
Figure 14E:
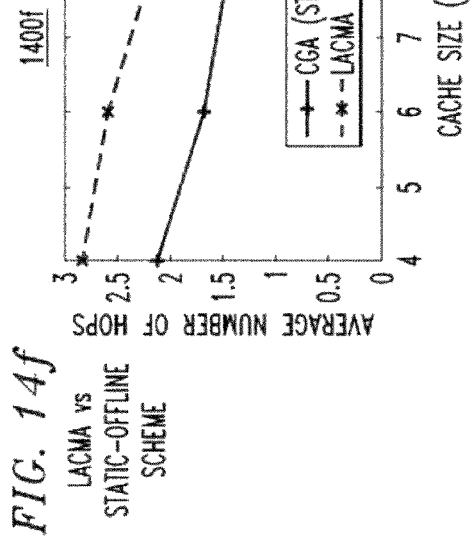
FIG. 14e is a graph illustrating the present location-aided content management approach (LACMA) versus a static-offline scheme in terms of the number of nodes in the network according to an embodiment of the present invention.
Figure 14F:
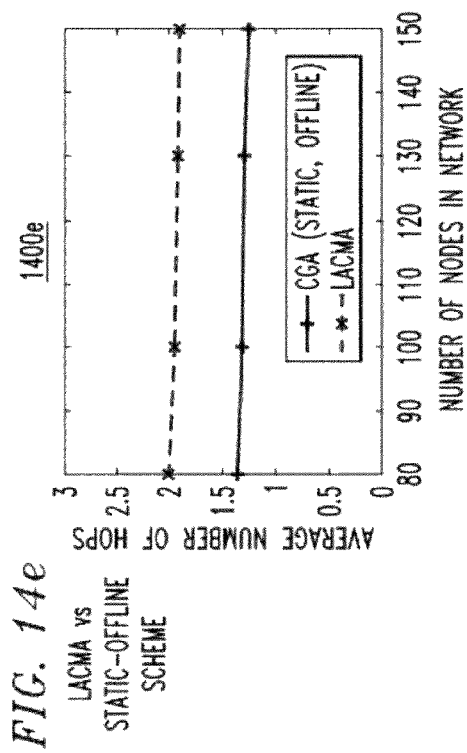
FIG. 14f is a graph illustrating LACMA versus the static-offline scheme in terms of the cache size according to an embodiment of the present invention.
Figure 14G:
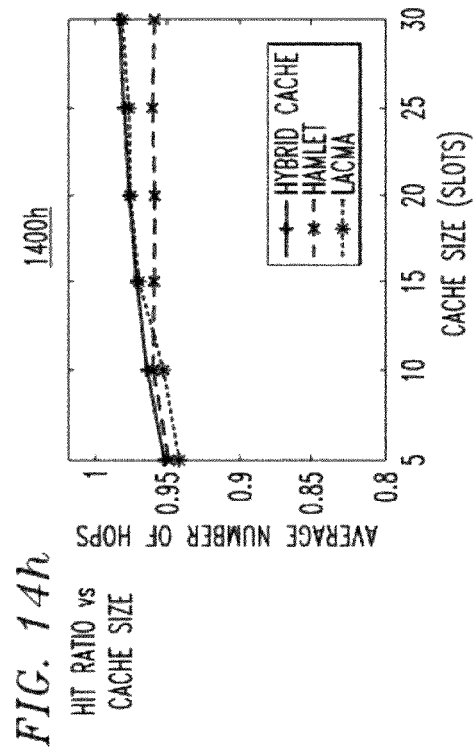
FIG. 14g is a graph illustrating LACMA versus the static-offline scheme in terms of the Zipf parameter a according to an embodiment of the present invention.

FIG. 14c is a graph 1400c that plots the hops versus popularity distribution. In graph 1400c, the Zipf parameter α is plotted on the x-axis and average number of hops is plotted on the y-axis. FIG. 14c shows more interesting results, where the Zip parameter α is varied from 0 to 1. It is seen that LACMA performs the best not only for when α is large (typical Zipf-like cases), but also for α=0 (uniform popularity). This can be explained by the fact that LACMA, in any case, provides coarse-grained bound(s) on the distance to contents while the other two schemes (HybridCache and Hamlet) solely operate on the query pattern. Recall that when α=0, the present placement method results in a single layer whose cell size is large enough to bind all items (see FIGS. 5 and 6), making the distance still bounded within a cell.

FIG. 14d is a graph 1400d that presents the results under different node speed. In graph 1400d, the maximum node speed (measured in m/s) is plotted on the x-axis and average number of hops is plotted on the y-axis. FIG. 14d depicts that LACMA again outperforms the other two (HybridCache and Hamlet), and their performance differences are almost constant for all speeds. The reasons for these schemes to have mobility-insensitive performance are quite different. HybridCache and Hamlet are query driven so that the distance (from node x to any content) is not much affected by which are x's current nearby nodes, in the sense that each node issues its requests independently of one another. On the other hand, LACMA provides the distance bound (i.e., cell-level placement) against node mobility. LACMA however comes with an increased maintenance cost with node speed, which will be presented below.

Figure 14H:
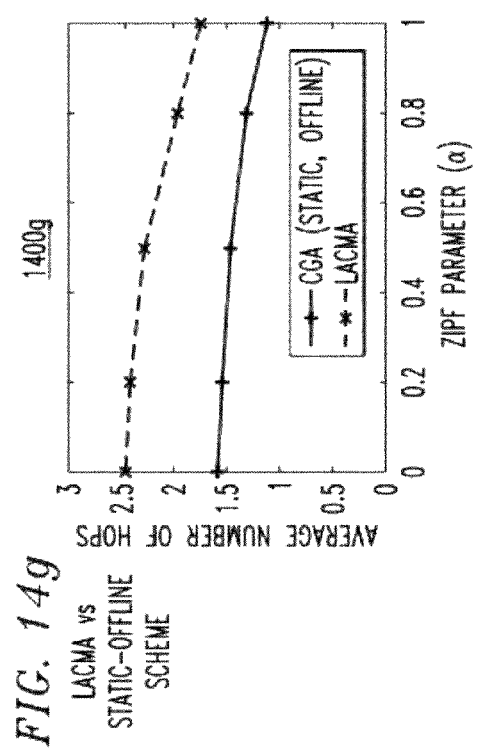
FIG. 14h is a graph illustrating hit ratio versus cache size according to an embodiment of the present invention.

Next, the amount of query traffic generated from all schemes is evaluated. As in Fiore, mitigated flooding is employed for HybridCache and Hamlet query propagation, where the query search range is limited by forcing a time-to-live (TTL) (with default value of 10 hops, e.g., the content will be dropped (not further forwarded) after 10 hops of forwarding)) in the query message. For LACMA, the initial query search range is within a cell of the target layer, such that a node only forwards the query originating in the same cell, otherwise the query is discarded. It is notable that, for all schemes, unsuccessful search attempts result in an increased propagation range. FIGS. 14i and 14j are graphs 1400i and 1400j which plot the simulation results of the total number of query messages propagated through the network, with varying the mean query generation time and the number of nodes, respectively. In graph 1400i, mean query generation time (measured in seconds (s)) is plotted on the x-axis and total number of query forwarded is plotted on the y-axis. In graph 1400j, number of nodes in the network is plotted on the x-axis and total number of query forwarding is plotted on the y-axis. It can be seen that LACMA significantly reduces the query search traffic by around 50 percent to 55 percent over the other two (HybridCache and Hamlet). The reason is that, in most cases, nodes can reach the requested contents within their cells instead of further searching beyond the cell. Therefore, the query messages travel less number of hops as compared to the other two schemes (HybridCache and Hamlet) that blindly search throughout the network. It is notable that all three schemes (the present techniques included) have a similar query hit-ratio (see FIG. 14h) that is defined as the ratio of successful search within TTL range. FIG. 14h is a graph 1400h showing hit ratio versus cache size. In graph 1400h, cache size (slots) is plotted on the x-axis and average number of hops is plotted on the y-axis.

Attention is now turned to the maintenance cost that LACMA pays for the above benefits. Given that the worst-case trend (i.e., blind-push) has been analyzed, we are interested to use simulations to study the average-case performance of the probabilistic push (i.e., Prob-push) that is being proposed. For reference, the results of the ideal case of perfect synchronization (i.e., Perfect-sync) are also presented. FIGS. 14k and 14l are graphs 1400k and 1400l which plot the results of the average number of push operations performed in a cell per unit time, with varying the mean query generation time and the node speed, respectively. In graph 1400k, mean query generation time (measured in seconds) is plotted on the x-axis and average push operations in cell per minute is plotted on the y-axis. In graph 1400l, maximum node speed (measured in m/s) is plotted on the x-axis and average push operations in cell per minute is plotted on the y-axis. Two observations are made. First, Prob-push significantly reduces the unnecessary push operations as compared to Blind-push (nearly a factor of 15), and the performance of Prob-push is quite close to perfect synchronization (where the nodes are perfectly synchronized—the best results attainable, i.e., ideal performance). Second, for all three cases the push cost increases with the node speed, but the slopes of Prob-push and Perfect-sync are much lower than that of Blind-push. Prob-push still shows a close performance to Perfect-sync with the node speed.

In summary, LACMA outperforms the other two (HybridCache and Hamlet) caching schemes in all simulation scenarios (i.e., reducing the average hop count nearly 20 percent to 45 percent, and query search traffic by 50 percent to 55 percent), with only limited overhead (i.e., less than 1.5 pushes per minute for pedestrian speed mobility). LACMA only performs around one hop worse than the ideal centralized offline placement scheme.

Several practical issues related to LACMA are now discussed. First, mobile nodes running LACMA need to know the placement information of the network (e.g., layers, cell size, etc.) so as to perform the push operation accordingly. It is expected that this decision is made by a network operator who executes the placement method, and makes the information available to the network nodes. For example, a university can be the operator in charge of a campus network scenario. The content popularity information which is the input for the placement method can be estimated/obtained by prior statistics, e.g., the record of access history in the university server.

Otherwise the uniform popularity can be temporarily used until collecting enough statistics.

Second, regarding contents with spatial characteristics one may want to extend the application of LACMA to the case where content popularity shows strong spatial pattern. For example, the access pattern in the area near the computer science department will be different from the area near the biology department. One simple option to handle the spatial popularity is to first identify such areas and apply the present placement methodology to these regions separately. Note that this only requires modifying the binding policy while keeping the maintenance mechanisms unchanged.

Third, in reality mobile users occasionally turn their devices into power-saving mode. Although the current design of LACMA does not consider such an on/off behavior of the network nodes, the same push mechanism can be applied. Before turning into sleep mode, a node can trigger the push operation so that it hands over, if necessary, certain cached items to nearby active nodes. This results in a similar effect as leaving the cell.

Thus in conclusion, node mobility has been a major obstacle for content placement and maintenance in a highly mobile environment. Existing techniques designed for static networks cannot cope with such dynamics. The present LACMA techniques take a novel location-based approach to decouple the node mobility from the corresponding topology dynamics. The layered grid structure of LACMA simplifies the content management complexity and offers coarse-grained bound for content availability. The extensive simulations show that LACMA considerably outperforms existing content management schemes at a reasonable management cost.

Figure 15:
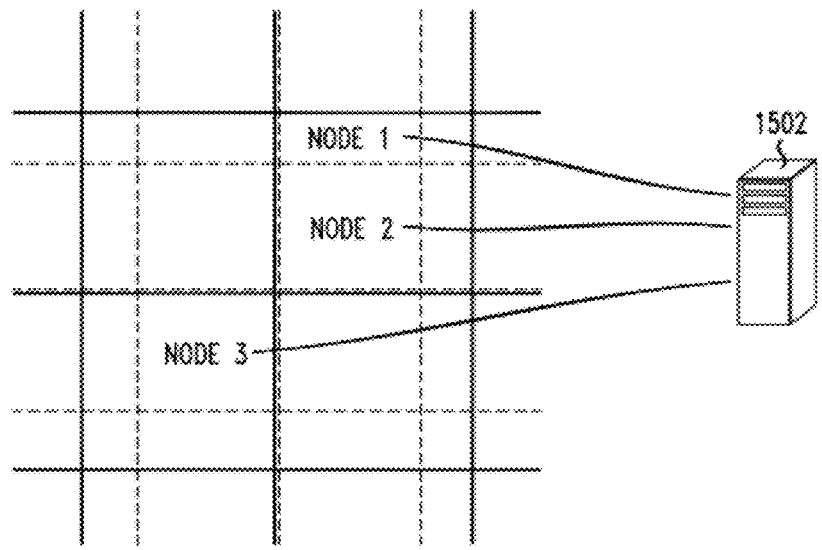
FIG. 15 is a diagram illustrating an exemplary MANET according to an embodiment of the present invention.

FIG. 15 is a diagram illustrating an exemplary MANET 1500. According to the present teachings, multiple virtual layers of grids (each grid containing a plurality of virtual cells) have been constructed on the physical MANET area. In the example depicted in FIG. 15, two layers of grids have been constructed. For ease of depiction, one layer of grids is shown using solid lines and the other is shown using dashed lines. Of course, the number of layers shown is merely exemplary and FIG. 15 is being used herein merely to exemplify the present teachings. As highlighted above, the nodes (labeled "node 1," "node 2," etc.) move freely on top of the layers. FIG. 15 illustrates that two nodes may be in the same cell of one layer, but in separate cells in another layer. Take nodes 1 and 2 in FIG. 15 as an example. Nodes 1 and 2 are both in the same solid line cell, but in different dashed line cells.

As shown in FIG. 15, each of the nodes can connect (wirelessly) to a network server 1502. As described above, the network server 1502 can create the virtual grid structure and bind content to the grid structure. As shown in FIG. 15, the nodes can obtain the grid structure from the network server 1502.

Turning now to FIG. 16, a block diagram is shown of an apparatus 1600 for implementing one or more of the methodologies presented herein. By way of example only, apparatus 1600 can be configured to implement one or more of the steps of methodology 100 of FIG. 1 and/or the steps of methodology 300 of FIG. 3 for managing content in a mobile ad hoc network (MANET). Apparatus 1600 generally represents an apparatus configuration that may be implemented in a single or multiple apparatuses to perform one or more of the methodologies herein. For example, as highlighted above, the steps of methodology 100 can be carried out by a network server. According to an exemplary embodiment, apparatus 1600 generally represents an apparatus that can be configured to serve as the network server. Further, as highlighted above, the steps of methodology 300 can be carried out by the nodes in the network. Apparatus 1600 generally represents an apparatus that can be configured to serve as one of the nodes, or in plural form as multiple nodes.

Apparatus 1600 comprises a computer system 1610 and removable media 1650. Computer system 1610 comprises a processor device 1620, a network interface 1625, a memory 1630, a media interface 1635 and an optional display 1640. Network interface 1625 allows computer system 1610 to connect to a network, while media interface 1635 allows computer system 1610 to interact with media, such as a hard drive or removable media 1650.

As is known in the art, the methods and apparatus discussed herein may be distributed as an article of manufacture that itself comprises a machine-readable medium containing one or more programs which when executed implement embodiments of the present invention. For instance, when apparatus 1600 is configured to implement one or more of the steps of methodology 100 the machine-readable medium may contain a program configured to bind the content to one or more geographical locations such that, at any given time, the content is stored on at least one of the nodes at the geographical location.

The machine-readable medium may be a recordable medium (e.g., floppy disks, hard drive, optical disks such as removable media 1650, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used.

Processor device 1620 can be configured to implement the methods, steps, and functions disclosed herein. The memory 1630 could be distributed or local and the processor device 1620 could be distributed or singular. The memory 1630 could be implemented as an electrical, magnetic or optical memory, or any combination of these or other types of storage devices. Moreover, the term "memory" should be construed broadly enough to encompass any information able to be read from, or written to, an address in the addressable space accessed by processor device 1620. With this definition, information on a network, accessible through network interface 1625, is still within memory 1630 because the processor device 1620 can retrieve the information from the network. It should be noted that each distributed processor that makes up processor device 1620 generally contains its own addressable memory space. It should also be noted that some or all of computer system 1610 can be incorporated into an application-specific or general-use integrated circuit.

Optional video display 1640 is any type of video display suitable for interacting with a human user of apparatus 1600. Generally, video display 1640 is a computer monitor or other similar video display.

Although illustrative embodiments of the present invention have been described herein, it is to be understood that the invention is not limited to those precise embodiments, and that various other changes and modifications may be made by one skilled in the art without departing from the scope of the invention.

What is claimed is:

1. A method of managing content stored on a plurality of mobile nodes in a mobile ad hoc network (MANET), comprising:

binding, using computer memory, the content to one or more geographical locations such that, at any given time, the content is stored on at least one of the nodes at the geographical location by: (i) constructing one or more virtual layers of geographic grids on a physical area of the MANET, wherein each of the layers comprises a plurality of same-sized virtual cells; and (ii) assigning the content to the cells in each of the layers.

2. The method of claim 1, wherein assigning the content to the cells in each of the layers comprises:
binding a same content to each of the cells in a given one of the layers.

3. The method of claim 1, wherein a set of content assigned to the cells in a given one of the layers is different from a set of content assigned to the cells in all of the other layers.

4. The method of claim 1, wherein a size of the grid in a given one of the layers can vary depending on an amount of content assigned to the cells in the given layer and a popularity of the content assigned to cells in the given layer.

5. The method of claim 4, wherein a greater the popularity of the content assigned to the cells in a given one of the layers a smaller a size of the cells in the given layer.

6. The method of claim 4, further comprising:
determining the popularity of the content.

7. The method of claim 1, further comprising:
maintaining at least one copy of the content within each of the cells in the given layer.

8. The method of claim 7, wherein the nodes move freely around on top of the layers, and wherein maintaining at least one copy of the content within each of the cells in the given layer comprises:
proactively replicating the content from a node x, when node x leaves a given one of the cells, to one or more of the other nodes remaining in the given cell to maintain a copy of the content within the given cell.

9. The method of claim 1, wherein the nodes can retrieve current positioning data from one or more of a global positioning system and an indoor positioning system.

10. The method of claim 1, further comprising:
estimating a number of copies of the content within one or more of the cells.

11. The method of claim 1, further comprising:
maintaining a list of content stored in each node.

12. The method of claim 11, wherein each node can send a query to one or more of the other nodes to request content stored on the one or more other nodes, and wherein every node is able to listen in on any query requests that originate inside a given cell, the method further comprising:
updating the list of content for each node in a given cell that contains a copy of content $c_i$ whenever a copy for content $c_i$ is received by a node in the given cell.

13. The method of claim 11, further comprising:
exchanging lists of content between nodes within a given cell.

14. The method of claim 13, wherein the content lists are exchanged whenever a node discovers a new node in the cell.

15. The method of claim 13, wherein the content lists are exchanged at a regular time interval.

16. The method of claim 15, further comprising, for a given one of the nodes:
sending out a content list for the given node to all of the other nodes in the same cell at the regular time interval.

17. The method of claim 11, further comprising:
removing outdated data from the content lists.

18. An apparatus for managing content stored on a plurality of mobile nodes in a MANET, the apparatus comprising:
a memory; and
at least one processor device, coupled to the memory, operative to:
bind the content to one or more geographical locations such that, at any given time, the content is stored on at least one of the nodes at the geographical location by: (i) constructing one or more virtual layers of geographic grids on a physical area of the MANET, wherein each of the layers comprises a plurality of same-sized virtual cells; and (ii) assigning the content to the cells in each of the layers.

19. An article of manufacture for managing content stored on a plurality of mobile nodes in a MANET, comprising a machine-readable recordable medium containing one or more programs which when executed by a processor coupled to memory implement:
binding the content to one or more geographical locations such that, at any given time, the content is stored on at least one of the nodes at the geographical location by: (i) constructing one or more virtual layers of geographic grids on a physical area of the MANET, wherein each of the layers comprises a plurality of same-sized virtual cells; and (ii) assigning the content to the cells in each of the layers.

* * * * *